US011115920B1

(12) United States Patent
Seetharaman et al.

(10) Patent No.: US 11,115,920 B1
(45) Date of Patent: Sep. 7, 2021

(54) METHOD AND SYSTEM OF TEMPLATE-BASED DYNAMIC NETWORK SLICING

(71) Applicant: Wipro Limited, Bangalore (IN)

(72) Inventors: Swaminathan Seetharaman, Chennai (IN); Ravi Kumar Emani, Bangalore (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 16/836,279

(22) Filed: Mar. 31, 2020

(30) Foreign Application Priority Data

Mar. 31, 2020 (IN) .............................. 202041014332

(51) Int. Cl.
| | |
|---|---|
| *H04W 48/18* | (2009.01) |
| *H04W 24/08* | (2009.01) |
| *H04W 28/02* | (2009.01) |
| *H04L 29/08* | (2006.01) |
| *H04W 16/18* | (2009.01) |
| *H04W 24/02* | (2009.01) |

(52) U.S. Cl.
CPC ........... *H04W 48/18* (2013.01); *H04L 67/327* (2013.01); *H04W 16/18* (2013.01); *H04W 24/02* (2013.01); *H04W 24/08* (2013.01); *H04W 28/0268* (2013.01)

(58) Field of Classification Search
CPC . H04W 48/18; H04W 16/18; H04W 28/0268; H04W 24/02; H04W 24/08; H04L 67/327
See application file for complete search history.

(56) References Cited

U.S. PATENT DOCUMENTS

| | | | |
|---|---|---|---|
| 2017/0141973 A1 | 5/2017 | Vrzic | |
| 2020/0228405 A1* | 7/2020 | Fang | .................. H04L 41/0843 |

OTHER PUBLICATIONS

Seetharaman, S., "A Programmable and Adaptive Framework for 5G Network Slicing", IEEE 2019, pp. 553-559.
Vassilaras, et al.; "The Algorithmic Aspects of Network Slicing", IEEE Communications Magazine, vol. 55, issue 8, 2017, pp. 112-119.

(Continued)

*Primary Examiner* — Diane D Mizrahi

(74) *Attorney, Agent, or Firm* — Finnegan, Henderson, Farabow, Garrett & Dunner, LLP

(57) ABSTRACT

A method and system for template-based dynamic network slicing is disclosed. The method includes creating a service requirement set associated with a service request based on a plurality of characteristics of the service request. The method includes identifying a network slice template hierarchy based on the service requirement set and selecting one of reusing one of at least one of existing network slice instance and creating a new network slice instance. The method includes instantiating a service associated with the service request using one of the at least one of existing network slice instances and the new network slice instance. The method further includes monitoring the service and one of the at least one of existing network slice instances and the new network slice instance. The method includes performing adaptation of at least one thresholds and at least one factor.

20 Claims, 15 Drawing Sheets

(56) References Cited

OTHER PUBLICATIONS

3GPP TR 22.891 V14.2.0 (Sep. 2016), 3rd Generation Partnership Project; Technical Specification Group Services and System Aspects; Feasibility Study on New Services and Markets Technology Enablers; Stage 1 (Release 14), 2016, 3GPP a Global Initiative (955 pages).

3GPP TR 28.801 V15.1.0 (Jan. 2018), 3rd Generation Partnership Project; Technical Specification Group Services and System Aspects; Telecommunication management; Study on management and orchestration of network slicing for next generation network (Release 15), 2018, 3GPP a Global Initiative (75 pages).

3GPP TS 28.531 V16.5.0 (Mar. 2020), 3rd Generation Partnership Project; Technical Specification Group Services and System Aspects; Management and orchestration; Provisioning; (Release 16), 2020, 3GPP a Global Initiative (71 pages).

S. Seetharaman and D. Krishnaswamy, "A programmable and adaptive framework for 5G Network Slicing," 2019 IEEE 2nd 5G World Forum (5GWF), Dresden, Germany, 2019, pp. 553-559.

* cited by examiner

| Characteristic | User Input | Mapping rules and thresholds |
|---|---|---|
| Mobility | Geo-location | Based on SRV-TYPE and Geo-location |
| Security | High, medium, low | Based on user input, else default |
| Privacy | High, medium, low | Based on user input, else default |
| Isolation and resource-sharing (RES-SHAR-SRS) | Resource sharing - "Allowed" Isolation – Physical, logical | Based on user input |
| Access Network Type | Optional input | Based on security level and user input |

302

| Attribute | User input | Exemplary values (or) rules to derive values |
|---|---|---|
| Latency | Optional | Based on SRV-TYP |
| Slice Throughput | Optional | Minimum value determined based |
| Per-UE throughput | Optional | Minimum value determined based |
| Availability | Optional | Determined based on SRV-TYP |

METHOD AND SYSTEM OF TEMPLATE-BASED DYNAMIC NETWORK SLICING

TECHNICAL FIELD

This disclosure relates generally to network slicing and more particularly to method and system of template-based dynamic network slicing.

BACKGROUND

Network slicing is the ability to tailor a set of network functions to optimize use of the network for a given set of use case families (for example, enhanced mobile broadband, Internet of Things (IoT)), class of users (enterprise, residential), etc. or any combination of these. The idea is to 'partition' the network into logical slices, with each slice custom-configured to cater efficiently to the traffic of that slice. Network slicing enables greater network efficiency and more optimal use of network resources without having to over-engineer the capacity in order to cater to diverse set of use cases, scenarios, and user categories (as foreseen for 5G networks). Network slicing can be done statically as well as dynamically. If done statically, the network is 'partitioned' in a static manner without considering the dynamic needs of a service, resource occupancy levels in different slices, thereby making it unsuitable to cater effectively to service requirements as well as inefficient in being able to cater to new service requests. So dynamic network slicing is preferred in most scenarios.

However, dynamic network slicing has multiple problems. One of the problems may be interpretation of service request. Typically, when an enterprise user/operator requires a Communication Service (CS), they send a request for the same to the communication service management sub-system. This request may not have the necessary information about network-related requirements such as latency, throughput, etc., which are essential for allocating an appropriate network slice. In absence of this information, the network orchestrator may not be able to allocate an appropriate slice for the requested CS. So, high-level requirements and intent of the requestor of the service needs to be interpreted by the network orchestrator (and form service requirements) that provides the required network slice with suitable configuration.

Another problem may be determining appropriate slice configuration. While deciding on an appropriate network slice to be allocated for the CS, the Network Orchestrator needs the appropriate slice configuration information. The service requirements as requested by the CS may vary widely in terms of service characteristics, service performance requirement, etc. In such a scenario, while deciding on the suitable network slice configuration, the network orchestrator may not be able to provide the most suitable slice configuration for the requested service. This mismatch may arise due to either time constraint for such decisions or diversity of configuration parameters involved.

One of the conventional systems tries to address the above problems by providing a suitable template for a requested CS. This conventional system provides one or more suitable templates including creation of a new network slice template and modification of an existing network slice template. Once a slice template has been received, the network orchestrator now needs to determine the subnet (or network segment, for example Radio Access Network (RAN), Transport network or backhaul, etc.) level structure for the detailed configuration at subnet level. This conventional system tries to provide suitable templates for each of the subnets also. So, it is possible for the network orchestrator to obtain the hierarchy of templates for the network slice level as well as slice subnet level for deciding on the overall slice configuration. Although, the network orchestrator now has the resource requirements for a slice and its relevant subnets, it still needs to determine the suitable sources of such resource allocation for creating of the network slice. This conventional system fails to provide a solution for this problem.

This conventional system further suggests determination of suitable sources of resource allocation but does not disclose details. Further prior-arts do not delve into the hierarchy of slice subnets and Virtualized Network Functions (VNFs)/software/hardware resources that can be shared, while suggesting such resource allocation approaches. In another scenario, there may be multiple network slice instances created from the same network slice template (with similar or different configurations) that may be available to reuse for fulfilling a particular service request. The network orchestrator may try to choose one or more of such available network slice instances that may or may not require modification. In such a scenario, the challenge for the network orchestrator is how to determine the most suitable network slice instances to use without modification or to choose one which can be used with minimal modification.

Another conventional system proposes a mechanism of determining the most suitable network slice instance from the list of existing network slice instances derived from a single network slice template for fulfilling the service request. For determining the most suitable network slice instance, this conventional system considers the resource utilization levels in the existing network slice instances. However, this conventional system does not consider "closeness" of the requirements in the received request to allocate a slice instance (service request) with the existing network slice instances that have been instantiated with the same network slice template. "Closeness" could be supported Key Performance Indicators (KPI) values/ranges by the existing network slice instances as compared to the received service request. This is very important because it is practically very difficult to define network slice templates for each individual KPI value, so KPI values will typically be defined as ranges, hence making the comparison on "closeness" very important in allocating a suitable network slice instance for the received service request. Additionally, this conventional system does not consider aspects such as feasibility to scale, as well as current and past performance of the network slice instance, subscriber category, etc., which are important to allocate a suitable network slice instance to fulfill the service request properly. Further, this conventional system does not disclose how feasibility to modify is determined.

This conventional system also proposes a mechanism of determining the most suitable network slice subnet instance from the list of network slice subnet instances created from the same network slice subnet template based on match between the budget (for example, latency limits) and requirements (for example, mobility level, sharing level) for that slice subnet and the corresponding values in the existing network slice subnet instances. However, it has multiple issues, which may include: It proposes a static method of determining the budget for a slice subnet based on a simple arithmetic computation. This may result in inappropriate split of the available budget across various slice subnets, and/or result in inappropriate slice subnets being allocated or new slice subnets being created when it is not needed to do so (thereby causing resource overheads). Also, it does not consider feasibility aspects such as feasibility to scale, current and past performance of the network slice subnet instance, subscriber category, etc. Further, it proposes modification feasibility to be assessed simply based on availability of appropriate resources and technical feasibility of modification, but does not disclose further details, for example, on how technical feasibility is determined.

Conventional systems fail to disclose mechanisms of the best possible way of assembling network slice subnet instances to form a suitable network slice instance. The conventional systems do not propose an adaptive mechanism of determining suitable network slice instance/network slice subnet instance, for example, sometimes it may be desirable to determine the suitable network slice instance that causes minimum changes in the network, while on other occasions it may be desirable to determine a suitable network slice instance that results in use of optimal network resources.

The existing mechanisms provided by the conventional methods fails to address creation of a most appropriate hierarchy of network slice shell and network slice subnet instances that is suitable for fulfilling a service request. The above issues are likely to lead to unsuitable slice instance formation and configuration resulting in below par service quality, degrade network performance due to inappropriate use of resources and overheads. Thus, there is a need for a mechanism of most suitable network slice hierarchy formation for appropriate fulfilment of a service request while ensuring optimal use of network resources.

SUMMARY

In one embodiment, a method of template-based dynamic network slicing is disclosed. The method includes validating, by a network slicing device, a service request comprising a plurality of characteristics. The method further includes creating, by the network slicing device, service requirement set associated with the service request based on the plurality of characteristics. The service requirement set comprises service characteristics, service performance requirements, and service dimensions associated with the service request, and wherein a plurality of resource attributes and a plurality of requirement attributes are associated with the service requirement set. The method includes identifying, by the network slicing device, a network slice template hierarchy based on the service requirement set. The network slice template hierarchy comprises information associated with at least one of suitable templates for end-to-end network slice, network slice subnets, and corresponding constituents. The method further includes selecting, by the network slicing device, one of reusing one of at least one of existing network slice instance and creating a new network slice instance, based on the identified network slice template hierarchy and the service requirement set. The method further includes instantiating, by the network slicing device, a service associated with the service request using one of the at least one of existing network slice instances and the new network slice instance. The method includes monitoring, by the network slicing device, the service and one of the at least one of existing network slice instances and the new network slice instance, in response to instantiating the service, wherein a result of the monitoring is used for detecting and fixing at least one issues identified during monitoring of instantiated service. The method further includes performing, by the network slicing device, adaptation of at least one threshold and at least one factor used to perform network slicing, based on the at least one issues identified.

In another embodiment, a system for template-based dynamic network slicing is disclosed. The system includes a processor and a memory communicatively coupled to the processor. The memory includes processor instructions, which when executed by the processor, cause the processor to perform the method as disclosed above.

In yet another embodiment, a non-transitory computer-readable storage medium is disclosed. The non-transitory computer-readable storage medium having stored thereon, a set of computer-executable instructions causing a computer comprising one or more processors to perform the method as disclosed above.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 illustrates an adapted service characteristics table and an adapted service performance requirement table, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
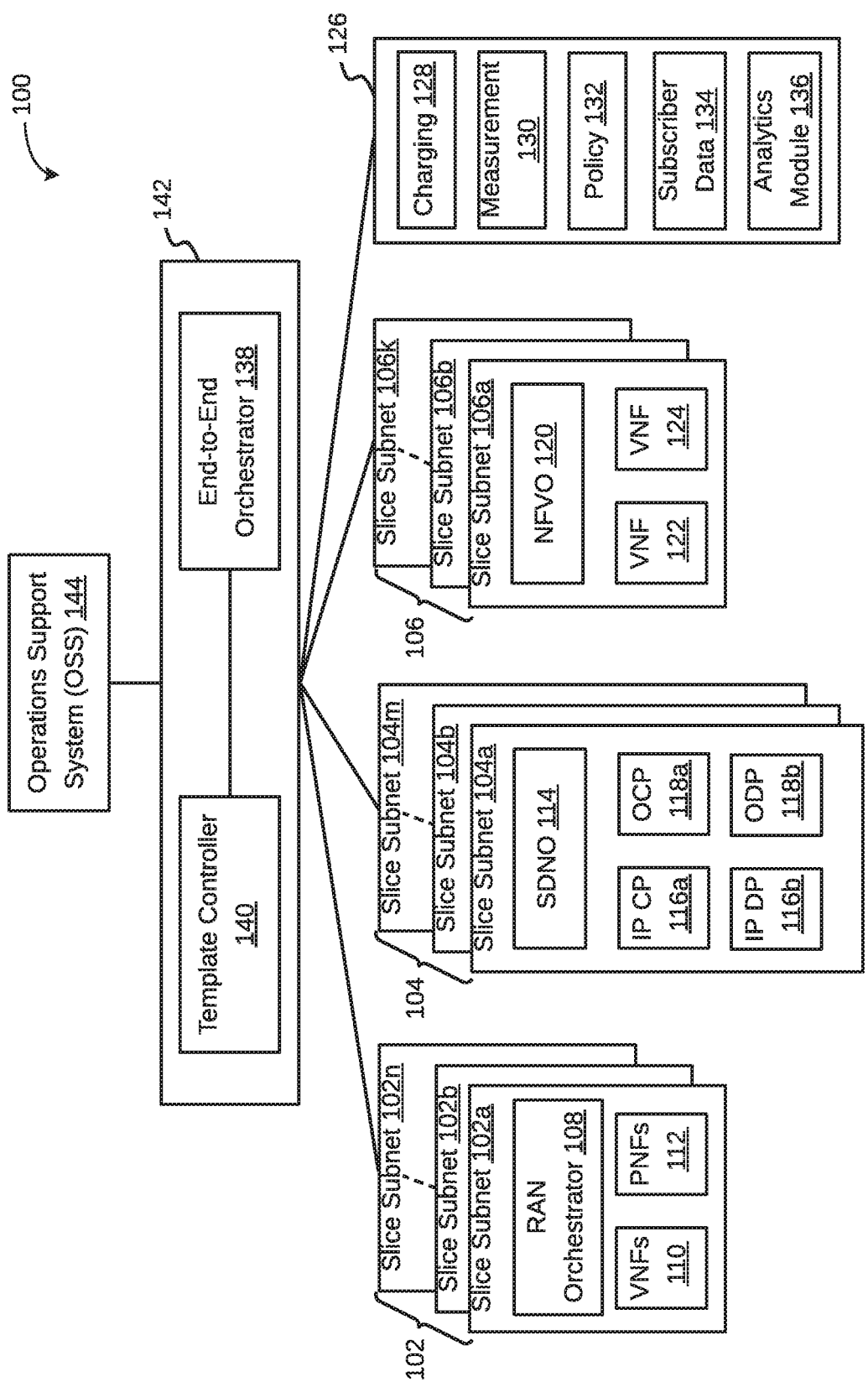
FIG. 1 is a block diagram of a system for template-based dynamic network slicing, in accordance with an embodiment.

Referring now to FIG. 1, a block diagram of a system 100 for template-based dynamic network slicing is illustrated, in accordance with an embodiment. The system 100 displays an end-to-end view of various components in a network that is configured for network slicing. The system 100 depicts a plurality of network segments (also called subnets), for example, a Radio Access Network (RAN) network segment 102, a transport/backhaul network segment 104, and a core network 106. Each of the plurality of network segments include a plurality of slice subnet instances which are also called slice subnets. By way of an example, the RAN network segment 102 includes slice subnets 102a to 102n. By way of another example, the transport/backhaul network segment 104 includes slice subnets 104a to 104m. By way of yet another example, core network 106 includes slice subnets 106a to 106k.

Each of the plurality of network segments may include network functions and interconnections. Further, each of the plurality of network segments may also include a domain controller or orchestrator. The RAN network segment 102 may include a RAN Orchestrator 108 and a plurality of Virtual Network Functions (VNFs) 110 and a plurality of Physical Network Functions (PNFs) 112. The VNFs 110 and PNFs 112 may be specific to a RAN slice subnet (102a to 102n) or may be shared across more than one RAN slice subnets 102a to 102n in the RAN network segment 102. The transport/backhaul network segment 104 may include a Software Defined Network Orchestrator (SDNO) 114, IP Control Plane (IP CP), IP Data Plane (IP DP), Optical Control Plane (OCP) and Optical Data Plane (ODP). The IP CP, IP DP, OCP and ODP may be specific to a transport slice subnet instance within 104a to 104m or may be shared across more than one transport slice subnet 104a to 104m within the transport/backhaul network segment. For example, in FIG. 1, 116a and 118a refer to an IP Control Plane (IP CP) and an Optical Control Plane (OCP) respectively that are part of slice subnet instance 104a. 116b and 118b refer to an IP Data Plane (IP DP) and an Optical Data Plane (ODP) respectively that are part of Slice subnet instance 104b. The core network segment 106 may include a Network functions virtualization Orchestrator (NFVO) 120, VNFs, for example, VNF 122, VNF 124, and their interconnections.

In an embodiment, for each of the plurality of network segments, a domain controller or orchestrator may be common across a corresponding plurality of slice subnets. By way of an example, the RAN orchestrator 202 may be common across the slice subnets 102a to 102n. In other words, the domain controller or orchestrator may be slice-agnostic. Alternatively, a separate domain controller or orchestrator may exist for each slice subnet depending on a deployment scenario.

Common functions 126 across each of the plurality of network segments, are slice-agnostic functions and are thus depicted separately. The common functions, for example, may include, functions for charging 128, measurement 130, policy 132, subscriber data (and its management) 134, and an analytics module 136. The common functions 126 may be realized as being part of a separate network segment that includes one slice subnet, which is shared across all the network slices.

The system 100 may further include an end-to-end orchestrator 138 that may perform service orchestration, slice orchestration, and resource orchestration functions. The end-to-end orchestrator 138 may further be communicatively coupled to a template controller 140 within an orchestration plane 142. The template controller 140 is configured to maintain network slice templates for slice orchestration. The end-to-end orchestrator 138 is further explained in detail in conjunction with FIG. 2. The interface between the end-to-end orchestrator 138 and the template controller 140 may be a REpresentational State Transfer (REST) interface which is secured using https, for example, or the interface may be a proprietary message-based interface.

The end-to-end orchestrator 138 and the template controller 140 may be communicatively coupled to each of the plurality of network segments through a REST interface, netconf/yang-based interface (running over Transport Layer Security (TLS) or Stream Control Transmission Protocol (SCTP) or Transmission Control Protocol (TCP) over Internet Protocol (IP), or any proprietary interface for configuration, notification/reporting, and monitoring data transfer from the plurality of network segments to the end-to-end orchestrator 138.

The system 100 may further include an Operations Support System (OSS) 144, which may include suitable logic, circuitry, interfaces, and/or code. The OSS 144 is communicatively coupled to the end-to-end orchestrator 138 and the template controller 140 through an interface, which may be a REST interface (typically secure) or may use well-known protocols such as Simple Network Management Protocol (SNMP) or Netconf. The interface may also be proprietary.

Figure 2:
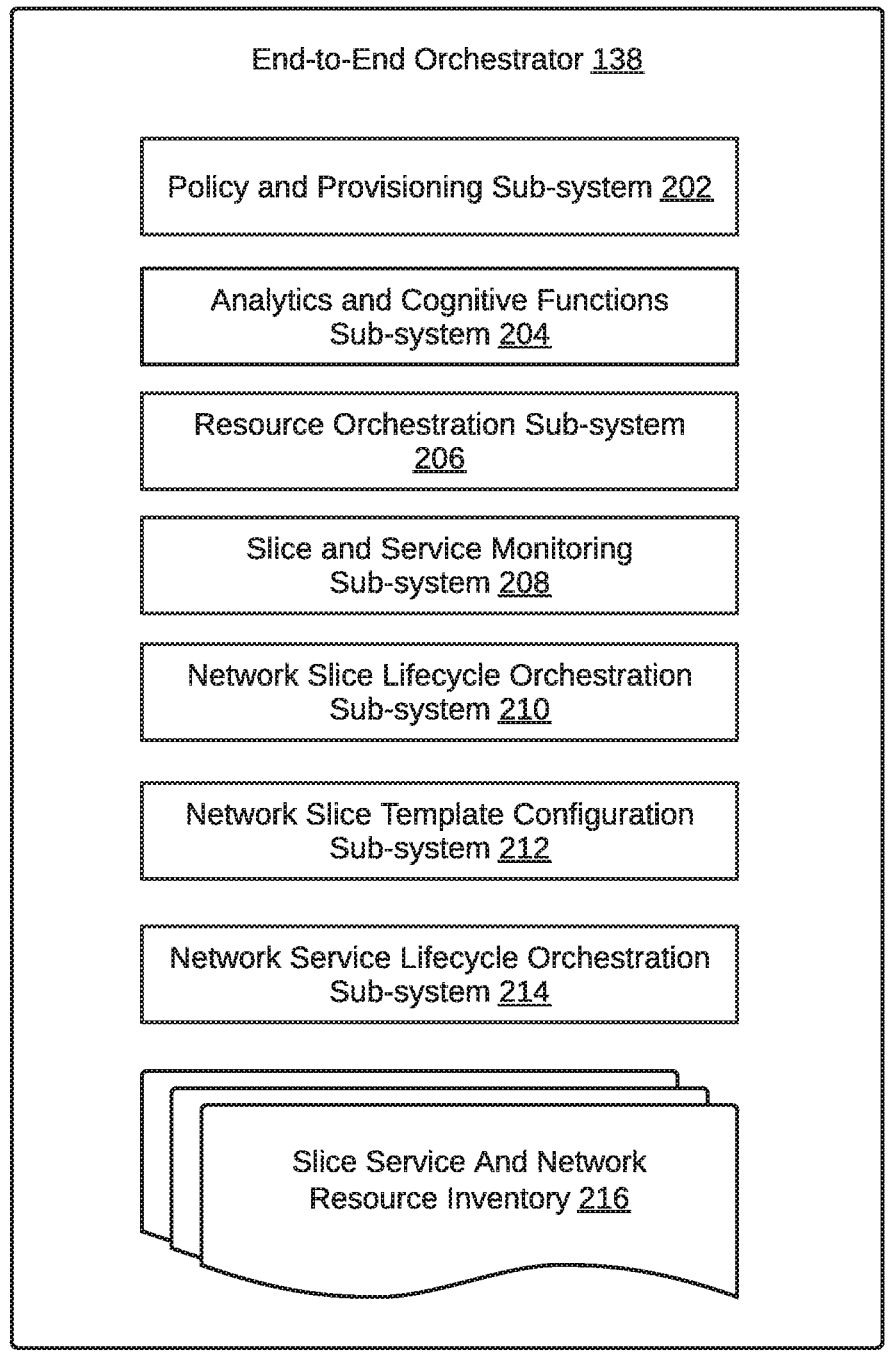
FIG. 2 is a block diagram of various modules within an end-to-end orchestrator configured for template-based dynamic network slicing, in accordance with an embodiment.

Referring now to FIG. 2, a block diagram of various modules within the end-to-end orchestrator 138 configured for template-based dynamic network slicing is illustrated, in accordance with an embodiment. The end-to-end orchestrator 138 includes a policy and provisioning sub-system (POPR-SS) 202, an analytics and cognitive functions sub-system (ACF-SS) 204, a resource orchestration sub-system (RESO-SS) 206, a slice and service monitoring sub-system (SLSRVMON-SS) 208, a network slice lifecycle orchestration sub-system (NSLO-SS) 210, a network slice template configuration sub-system (NESTC-SS) 212, a network service lifecycle orchestration sub-system (NSRVO-SS) 214, and slice, service, and network resource inventory (SSNR-IN) 216.

The POPR-SS 202 may be configured to receive all operator provisioned inputs and configuration policies and may then send the relevant aspects to relevant sub-systems in the end-to-end orchestrator 138. In addition to its existing functions, the POPR-SS 202 sub-system performs multiple functions that may include receiving policy inputs for network slice and network slice subnet selection including thresholds and rules. The POPR-SS 202 may share this information with the NESTC-SS 212 and may also receive operator inputs for slice monitoring and rules for taking automatic preventive and corrective actions. The POPR-SS 202 may receive inputs from the operator for creating a new service request. The service request may include the following fields: Service type (SRV-TYPE), Geographical location (GEO-LOC), which may indicate the service coverage area (for example, provide a list of locations or indicate them on a map), maximum number of users (MAX-USERS), Performance requirements (TARGET-SLA-KPI), dimensions, such as, Capacity (CAP), User density (USER-DEN), isolation and resource sharing levels (ISO-SHARING), and Security, Policy requirements/constraints (SEC-POL-RQMTS). The SRV-RQST may also include Mobility requirements (MOB-RQMT), or reliability, etc.

The NSLO-SS 210 may be configured to orchestrate lifecycle of a network slice, which may include instantiation, scaling, healing and modification, and finally termination. In addition to its existing functions, the NSLO-SS 210 performs the following actions. The NSLO-SS 210 interacts with the NESTC-SS 212 to obtain information about one or more network slice instances and/or one or more network slice subnet instances to be used, created, or modified. The NSLO-SS 210 instructs the SLSRVMON-SS 208 to monitor relevant Key Performance Indicators (KPI) adherence levels and trends. The NSLO-SS 210 also interacts with the NSRVO-SS 214 to provide appropriate network slice instance for the service. Additionally, the NSLO-SS 210 updates the SSNR-IN 216 and interacts with the ACF-SS 204.

The NESTC-SS 212 may be configured to perform template based dynamic network slicing. The NESTC-SS 212 may interact with the template controller 140 and may obtain a slice template hierarchy that may include Network Slice Templates (NSTs) and constituent Network Slice Subnet Templates (NSSTs) that are suitable for network slice to be provided, upon request for a network slice instance to be allocated based on the service request. The NESTC-SS 212 may determine a suitable network slice instance for fulfilling the service request. This is further explained in detail in conjunction with FIG. 4. The NESTC-SS 212 may interact with the RESO-SS 206 to obtain inputs regarding resource occupancy and allocations for network slice instances and network slice subnet instances.

The NSRVO-SS 214 is configured to orchestrate the lifecycle of a network service as requested by the operator. Service lifecycle orchestration actions may include, but are not limited to service instantiation, scaling, healing and modification, and finally termination of the service. In addition to its existing functions, NSRVO-SS 214 may interact with the NSLO-SS 210 to request for a network slice for fulfilling the service request received from the operator, via the POPR-SS 202. The ACF-SS 204 may be configured to perform Analytics and/or executing machine learning algorithms as instructed by the SLSRVMON-SS 208 or by the NSLO-SS 210/NSRVO-SS 214. In addition to its existing functions, the ACF-SS 204 may predict resource consumption of a network slice thereby enabling appropriate preventive/corrective actions to ensure KPI compliance of the network slice. The ACF-SS 204 also aids the NESTC-SS 212 during selection of an appropriate network slice instance or network slice subnet instance by providing relevant inputs on predicted resource occupancy levels, performance of a network slice instance when catering to a service with certain characteristics and performance requirements, performance of a network slice subnet instance when being a part of a network slice instance with certain characteristics and performance requirements, etc.

The RESO-SS 206 may be configured to perform resource orchestration for a service/slice, including resource allocation, scaling and healing of resources based on instruction from the NSLO-SS 210 or the NSRVO-SS 214 for service or slice, respectively. In addition to its existing functions, the RESO-SS 206 may interact with the NESTC-SS 212 to provide relevant resource allocation and occupancy details, or spare capacity, etc. The SLSRVMON-SS 208 may be configured to monitor the slice and service KPI adherence levels and trends, and to report any fault or performance issues to the respective sub-systems, i.e., the NSLO-SS 210 for network slices (and network slice subnets) and the NSRVO-SS 214 for services. In addition to its existing functions, the SLSRVMON-SS 208 may also assess the performance of network slices and passes relevant feedback to the NESTC-SS 212 for future operation with respect to adapted rules, parameter values and thresholds.

Finally, the SSNR-IN 216 may include details of network slice instances, slice subnet instances, services and network resources allocated to various slice and slice subnet instances and services. In addition to its existing data, the SSNR-IN 216 may include details of resource occupancy/usage levels for each service, slice instances and slice subnet instances, scaling limits for a slice/slice subnet, including dependencies across slice subnets, service requirement set and slice subnet requirements. The SSNR-IN 216 may also store adapted rules, as Adapted Service Characteristics Table (ADAPT-SRV-CHAR-TABLE). An exemplary ADAPT-SRV-CHAR-TABLE is depicted in FIG. 3 as a table 302. The SSNR-IN 216 may also store adapted service performance requirements as Adapted Service Performance Requirement Table (ADAPT-SRV-PERF-RQMTS-TABLE). An exemplary ADAPT-SRV-PERF-RQMTS-TABLE is depicted in FIG. 3 as a table 304.

Figure 4:
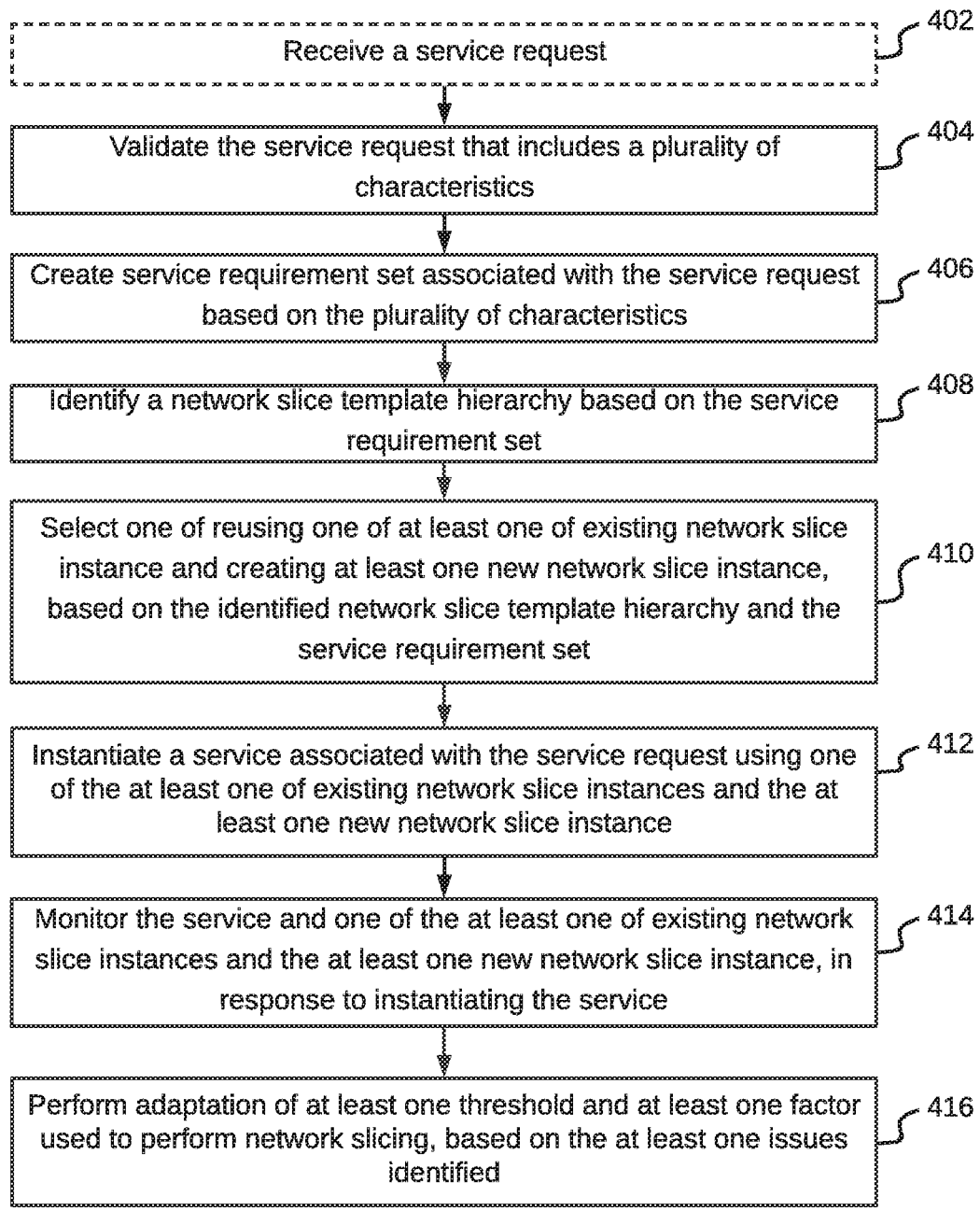
FIG. 4 is a flowchart of a method for template-based dynamic network slicing, in accordance with an embodiment.

Referring now to FIG. 4, a flowchart of a method for template-based dynamic network slicing is illustrated, in accordance with an embodiment. At step 402 a service request that includes a plurality of characteristics is received. The plurality of characteristics may include but is not limited to one or more of type of service (SRV-TYPE) (for example, broadband, smart home, or connected car, etc.), maximum number of users, or a geographical area where the service is required area. At step 404, a network slicing device validates the service request that may include a plurality of characteristics. The network slicing device may be the end-to-end orchestrator 138, which may include a processor and a memory not depicted in FIG. 2. In an embodiment, the POPR-SS 202 may receive the service request from an operator or a service provider for instantiating a new service. The POPR-SS 202 may validate the service request and may then pass it to the NSLO-SS 210.

At step 406, the network slicing device may create a service requirement set associated with the service request based on the plurality of characteristics. The service requirement set may include service characteristics, service performance requirements, and service dimensions associated with the service request. Additionally, a plurality of resource attributes and a plurality of requirement attributes may be associated with the service requirement set. In an embodiment, the NSLO-SS 210 may create the service requirement set. Creation of the service requirement set is further explained in detail in conjunction with FIG. 5.

At step 408, the network slicing device identifies a network slice template hierarchy based on the service requirement set. The network slice template hierarchy may include information associated with one or more of suitable templates for end-to-end network slice, network slice subnets, and corresponding constituents (for example, VNF/PNF details, type of hardware and software resources required). In an embodiment, the NESTC-SS 212 prepares and sends a Network Slice Template Request (NS-TMPLT-RQST) message to the template controller 140 for requesting a suitable network slice template hierarchy for fulfilling the service requirements as included the service requirement set. The template controller 140 may provide the suitable network slice template hierarchy using existing mechanisms.

At step 410, the network slicing device selects reusing one of one or more existing network slice instances or creating a new network slice instance, based on the identified network slice template hierarchy and the service requirement set. This is further explained in detail in conjunction with FIGS. 6A and 6B.

At step 412, the network slicing device instantiates a service associated with the service request using one or more of existing network slice instances or the new network slice instance. In other words, in one scenario, the network slicing device may instantiate the service using one or more of existing network slice instances. In this case, if any scaling of resources needs to be performed to the one or more of existing network slice instances to be reused, the NSLO-SS 210 may trigger the RESO-SS 206 to perform the scaling. Then, the NSLO-SS 210 may inform the NSRVO-SS 214 about the details of the one or more of existing network slice instances to which the service is to be mapped along with relevant details of the service request.

In the other scenario, the network slicing device may instantiate the service using the new network slice instance. In one implementation, the new network slice instance may be created by reusing one or more existing network slice subnet instances. In this implementation, the NSLO-SS 210 may then instruct the domain controller or orchestrator of those subnets to configure the one or more existing slice subnet instances to cater to the traffic of the new network slice instance. Further, the NSLO-SS 210 may request RESO-SS 206 to perform appropriate modification or scaling to resources based on the inputs provided by the NESTC-SS 212 to ensure that the subnet requirements are fulfilled.

In one implementation, the new network slice instance may be created by using one or more new network slice subnet instances. In this implementation, in an embodiment, the NSLO-SS 210 may request the RESO-SS 206 to allocate appropriate resources and create network slice subnet instances for the applicable subnets, for fulfilling the subnet requirements for those corresponding subnets. In both these implementations, after selecting an existing network slice subnet instance or creating a new network slice subnet instance for all applicable subnets as specified in the network slice template provided by the template controller 140, the NSLO-SS 210 may initiate proper concatenation of the one or more network slice subnet instances selected or created for the network slice instance being newly created. This is to ensure that the end-to-end network slice instance is setup properly. The NSLO-SS 210 may then associate the one or more network slice instances to the service and provides it to the NSRVO-SS 214 along with relevant details of the service request. Additionally, in both the scenarios discussed above, upon reception of details of the one or more network slice instances to which the service request is mapped, the NSRVO-SS 214 may initiate appropriate actions for instantiating the service with the help of RESO-SS 206 and the domain controllers or orchestrators.

At step 414, the network slicing device monitors the service and the existing network slice instance to be reused or the new network slice instance, in response to instantiating the service. A result of the monitoring is used for detecting and fixing at least one issues identified during monitoring of instantiated service. In an embodiment, the NSLO-SS 210 may then instructs the SLSRVMON-SS 208 to commence monitoring for the new service being instantiated, as well as the new network slice instance and/or network slice subnet instances that were created or modified. Such monitoring may include monitoring of resource usage and/or occupancy levels at the network instance level and network slice subnet instances level, Service Performance Requirement (SRV-PERF-REQ) compliance by network slice instance, Subnet Performance Requirement (SUBNET-PERF-REQ) compliance for each network slice subnet instance, alarms (for example, performance threshold crossed) at the service level, network slice instance level, network slice subnet instance level, resource outage or security violation faults in one or more network slice subnet instances, etc. This monitoring data may also be provided as input periodically to the ACF-SS 204, which may also perform a prediction of the trends and reports the results back to SLSRVMON-SS 208.

Based on the monitoring, issues may be predicted or detected in network slice instance and/or the service thus initiated. In an embodiment, the SLSRVMON-SS 208 may report any fault or performance issue in slice or service KPI adherence (detected or predicted by the ACF-SS 204) to the NSLO-SS 210 or NSRVO-SS 214 respectively. The NSLO-SS 210 may perform an analysis of the possible causes based on provisioned rules which may be adapted by the SLSRV-MON-SS 208. Such possible causes may include, but are not limited to insufficient resources in one or more network slice subnets, performance issue in a particular resource (for example, a network function), frequent alarms due to outage, poor radio conditions in the RAN subnet, etc.

In an embodiment, an in-session preventive or corrective action may be initiated. In an embodiment, the NSLO-SS 210 and/or the NESTC-SS 212 may then determine suitable action to resolve the fault or performance issue. By way of an example, if resource occupancy levels in a particular network slice subnet instance is greater than the occupancy threshold, resource scaling may be required to one or more network slice subnet instances. By way of another example, in case of hardware or software resource outage or failure, modification may be made to allocated resources. This may include re-allocation at appropriate location or due to failure of allocated resources, etc. By way of yet another example, in case of issues in end-to-end latency (for example, higher than a threshold) or jitter (value crossed a threshold) or throughput (drop below a threshold or variations beyond a threshold), while no proportionate issues in the individual resources subnet instances themselves, modification of connections across the resources subnet instances of the network slice instance may be made.

By way of an example, in case of consistent issues in compliance to the service requirement set by the network slice instance (after checking or trying other alternatives such as scaling of resources, modifying interconnections, etc.), mapping of the service to a more appropriate network slice instance may be performed. Additionally, in this case the NESTC-SS 212 may determine if an existing network slice instance may be reused or a new network slice instance may have to be created respectively. With regards to healing of faults, this may be achieved, for example, by re-initializing a resource, or restarting a network function, etc.

In some cases, the actions may first require root cause analysis to be performed by requesting the SLSRVMON-SS 208 for additional data and inputs (which, in turn, may request and obtain it from the concerned network segments) and then performing a step by step analysis involving correlation as well as other well-known techniques such as multi-variate regression, or other machine learning or analytics techniques. This may then be followed by determining one or more appropriate actions based on the determined root cause, carrying out the action and then continuing to monitor to determine if the fault or performance issue has been resolved or not. The above actions are performed based on provisioned rules and thresholds which are adapted dynamically upon termination of a network slice or service as described further.

Thereafter, at step 416, the network slicing device performs adaptation of at least one threshold and at least one factor used to perform the network slicing, based on the one or more issues identified. In an embodiment, upon termination of a network slice or a service, the NSLO-SS 210 and the NSRVO-SS 214 may trigger the SLSRVMON-SS 208 for relevant data on SRV-PERF-REQ adherence levels, SUBNET-PERF-REQ adherence levels, issues detected and resolved, etc. The NSLO-SS 210 and the NSRVO-SS 214 may then pass relevant inputs to the NESTC-SS 212 for determining the rules and thresholds to be adapted in network slice instance and network slice subnet instance selection.

The NESTC-SS 212 may then pass the relevant adaptations to be done to the SLSRVMON-SS 208, which may then perform the adaptations. By way of an example, the adaptations may include a scenario where scaling was recommended by the NESTC-SS 212 to a network slice instance at the time of allocating it to a service (i.e., reusing it), and was performed. However, the compliance to the service requirement set (SRV-PERF-REQ) was below acceptable limits. Additionally, high resource occupancy levels were reported (as alarms). In this case, a Resource Scoring Attribute (RES-SCORE-ATTRIB) adjustment factor may be adapted for scaling (omega) by a weighted factor proportionate to the non-compliance to the service requirement set. By way of another example, a similar adaptation as described in the above example may be performed to the Subnet Resource Score Attribute (SUBNET-RES-SCORE-ATTRIB) adjustment factor for scaling (epsilon) based on the performance and fault data of the network slice subnet instance.

By way of yet another example, if the network slice subnet instance was found to be unsuitable (i.e., SUBNET-PERF-REQ adherence level was <80%) consistently (i.e., on more than occasion), then a Subnet Requirement Suitability Score Threshold (SUBNET-REQ-SUIT-SCORE-THR) may be adapted by first examining the performance and fault data of other network slice subnet instances that had SUBNET-REQ-SUIT-SCORE-ATTRIB of at least one attribute to be less than 1, and thereafter determining their actual compliance to the corresponding attribute value in the SUBNET-PERF-REQ (as determined by examining the fault and performance data). Based on such an examination, the SUBNET-REQ-SUIT-SCORE-THR may then be adjusted (for example, by a factor between 0.1 and 0.5) based on the actual compliance level of other network slice subnet instances that had SUBNET-REQ-SUIT-SCORE-ATTRIB of at least one attribute to be less than 1. The SUBNET-REQ-SUIT-SCORE-ATTRIB may be adjusted based on the actual compliance level by a weight that takes into account the historical performance of other network slice subnet instances, which used the same (or similar) template hierarchy into consideration. The NESTC-SS 212 may also pass relevant information to the template controller 140 for providing more appropriate templates in the future. It will be apparent to a person skilled in that art that while the steps described above outline a method for a new service instantiation, most of the steps may be applicable also when a service is modified, for example, its KPIs or requirements, characteristics or coverage area may be modified.

Figure 5:
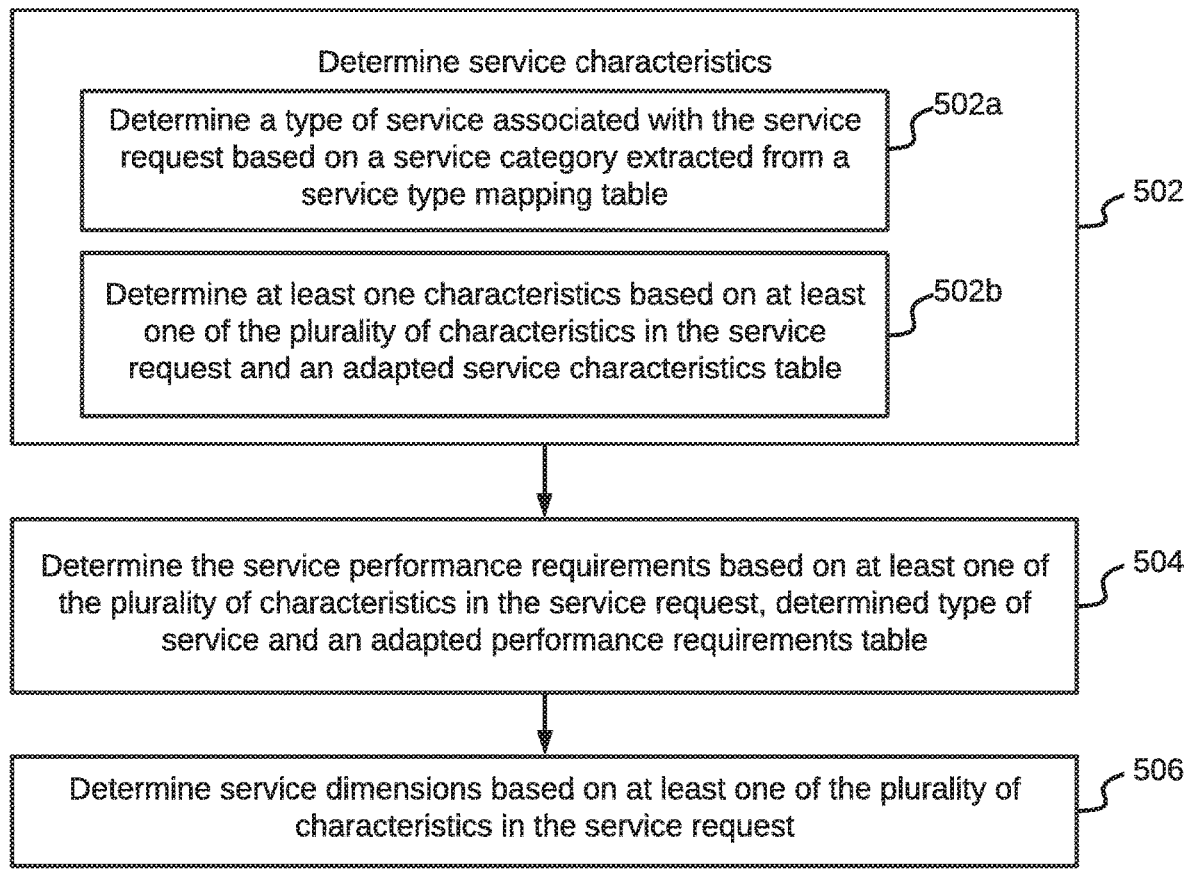
FIG. 5 is a flowchart of a method for creating service requirement set associated with a service request, in accordance with an embodiment.

Referring now to FIG. 5, a flowchart of a method for creating service requirement set associated with a service request is illustrated, in accordance with an embodiment. In an embodiment, the NSLO-SS 210 may perform this method in response to receiving the service request from the POPR-SS 202. At step 502, service characteristics are determined. To determine the service characteristics, at step 502a, a type of service associated with the service request is determined based on a service category (for example, premium broadband, factory automation, or connected home) extracted from a service type mapping table. At step 502b, one or more characteristics are determined based on at least one of the plurality of characteristics in the service request and an adapted service characteristics table (for example, the ADAPT-SRV-CHAR-TABLE 302). The one or more characteristics may include mobility requirement, security-privacy requirements, isolation, and resource sharing level.

At step 504, the service performance requirements are determined based on at least one of the plurality of characteristics in the service request, determined type of service and an adapted performance requirements table (for example, the ADAPT-SRV-PERF-RQMTS-TABLE 304). The service performance requirements may include one or more of latency, guaranteed throughput per user (uplink and downlink), reliability, availability and their associated target values. At step 506, the service dimensions may be determined based on at least one of the plurality of characteristics in the service request. The service dimensions may include one or more of a density, maximum number of users, capacity, throughput per slice, or at least one geographical location. Thus, the NSLO-SS 210 creates the service requirement that includes contents in service performance request, service characteristics, and service dimensions as determined above. The NSLO-SS 210 may then trigger the NESTC-SS 212 with the service requirement set for allocation of a suitable network slice instance on which the service can be instantiated.

Figure 6A:
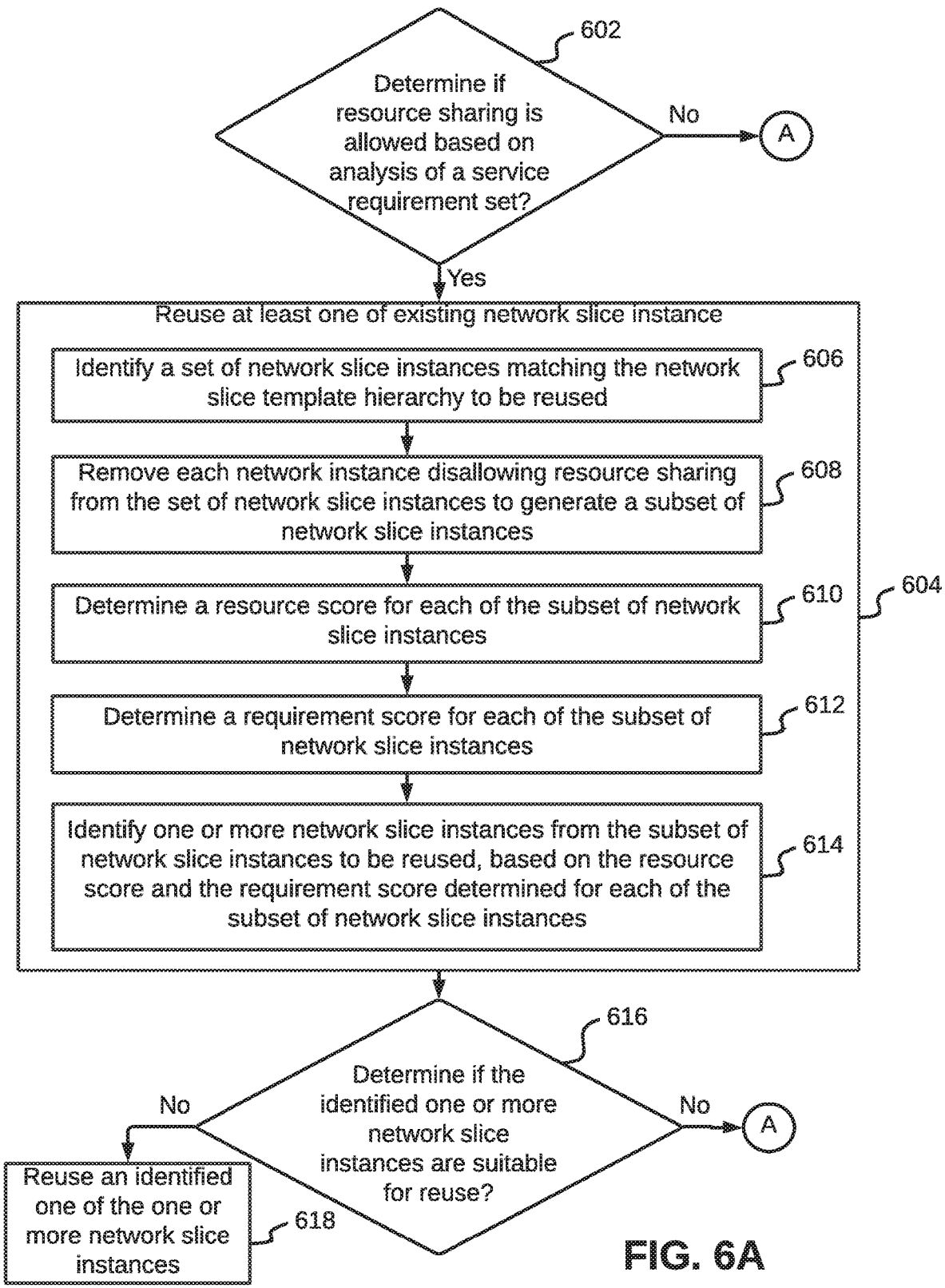
FIGS. 6A and 6B is a flowchart of a method for selecting one of reusing one of at least one of existing network slice instance and create a new network slice instance, in accordance with an embodiment.
Figure 6B:
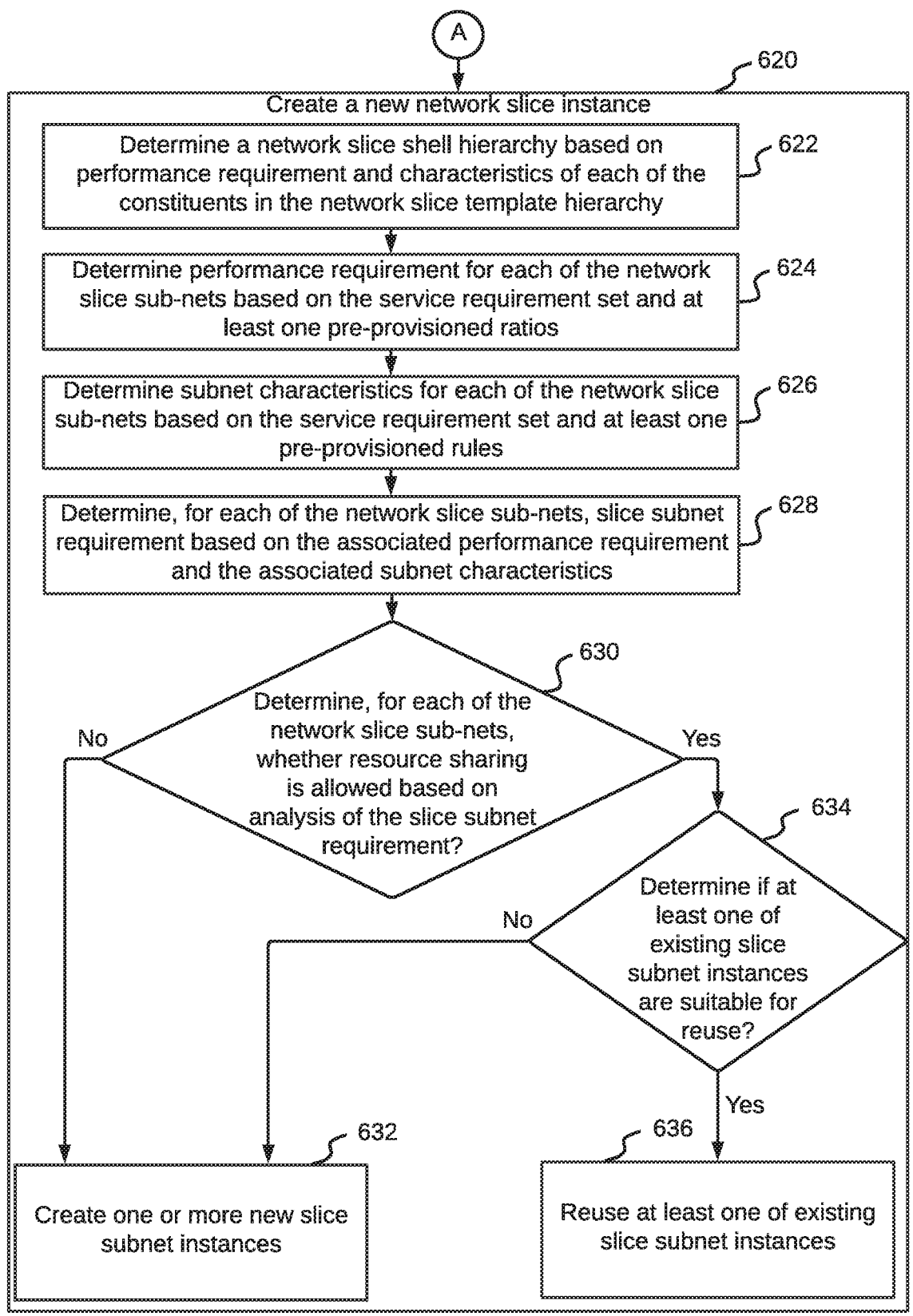

Referring now to FIGS. 6A and 6B, a flowchart of a method for selecting one of reusing one of at least one of existing network slice instance and creating one new network slice instance, in accordance with an embodiment. At step 602, a check is performed to determine if resource sharing is allowed based on analysis of a service requirement set. In an embodiment, upon reception of a template hierarchy information from the template controller 140, the NESTC-SS 212 may check for feasibility of reuse of existing network slice instances by checking if resource sharing is set to "allowed" in the service requirement set. If resource sharing is allowed, at step 604, one or more existing network slice instances may be selected for possible reuse. The step 604 further includes steps 606 to 614.

At step 606, a set of network slice instances matching the network slice template hierarchy are identified for possible reused. The set of network slice instances may be an Existing Network Slice Candidate List (EXIST-NS-INST-CAND-LIST). In an embodiment, the NESTC-SS 212 may identify one or more active network slice instances that have the same network slice template hierarchy. At step 608, each network instance disallowing resource sharing is removed from the set of network slice instances to generate a subset of network slice instances. In an embodiment, for all existing network slice instances that have the same network slice template hierarchy as that provided by the template controller 140, the NESTC-SS 212 forms the EXIST-NS-INST-CAND-LIST that includes a list of network slice instances that have the same network slice template hierarchy. For each network slice instance in the EXIST-NS-INST-CAND-LIST, the NESTC-SS 212 may perform the steps discussed above. For a given network slice instance, the NESTC-SS 212 may check whether the network slice instance allows sharing (as indicated in its properties), i.e., sharing the network slice instance across multiple service instances. If sharing is not allowed, then the NESTC-SS 212 may remove the network slice instance from the EXIST-NS-INST-CAND-LIST.

At step 610, a resource score (RES-SCORE) is determined for each of the subset of network slice instances. This is further explained in detail in conjunction with FIG. 7. At step 612 a requirement score (i.e., REQ-SUIT-SCORE) is determined for each of the subset of network slice instances. This is further explained in detail in conjunction with FIG. 8. At step 614, one or more network slice instances are identified from the subset of network slice instances to be reused, based on the RES-SCORE and the REQ-SUIT-SCORE determined for each of the subset of network slice instances. This is further explained in detail in conjunction with FIG. 9.

Thereafter, at step 616, a check is performed to determine if the identified one or more network slice instances are suitable for reuse. If the identified one or more network slice instances are suitable for reuse, one of the one or more identified network slice instances are selected for reuse at step 618. This is further explained in detail in conjunction with FIG. 9. However, if the identified one or more network slice instances are not suitable for reuse, the control moves to step 620. Referring back to step 602, if based on analysis of the service requirement set, if it is determined that resource sharing is not allowed, the control again moves to step 620. Thus, the control may move to step 620, when at least one condition is satisfied. The at least one condition may include disallowance of resource sharing in the service requirement set or non-suitability of reuse of the at least one of existing network slice instances.

At step 620, a new network slice instance may be created. The step 620 may further include steps 622 to 636. At step 622, a network slice shell hierarchy is determined based on performance requirement and characteristics of each of the constituents in the network slice template hierarchy. The network slice subnets in the network slice template hierarchy include one or more of a Radio Access Network (RAN) slice subnet, a transport slice subnet, a core slice subnet, and the associated subnet templates. In an embodiment, The NESTC-SS 212 determines the network slice shell hierarchy. The templates for each network slice subnet may also include resource requirements related information, along with any associated constraints.

While the embodiments described so far only discuss about one level of subnets and the associated slice subnet instances (i.e., a network is composed on RAN, Core and Transport subnets, and hence a network slice instance is composed of RAN slice subnet instance, transport slice subnet instance and a core slice subnet instance), the mechanism described in various embodiments may be easily applied even if there are multiple levels of subnets. By way of an example, the RAN subnet may be further composed of Fronthaul subnet, Midhaul subnet and RAN network functions subnet. By way of another example, the transport subnet may be composed of fronthaul subnet, Midhaul subnet, and backhaul subnet (instead of just backhaul).

At step 624, performance requirement (SUBNET-PERF-REQ) may be determined for each of the network slice subnets based on the service and one or more pre-provisioned ratios. In an embodiment, the NESTC-SS 212 may determine the SUBNET-PERF-REQ for each network slice subnet using the information in the service requirement set and the one or more pre-provisioned ratios (for example, the SRS-LATENCY in the service requirement set shall be split into RAN-SS-LAT, TRANS-SS-LAT, and CORE-SS-LAT in the ratio 30%-30%-40% based on the one or more pre-provisioned ratios).

At step 626, subnet characteristics (SUBNET-CHAR) may be determined for each of the network slice subnets based on the service requirement set and one or more pre-provisioned rules. Thereafter, at step 628, for each of the network slice subnets, slice subnet requirement (SLICE-SUB-NET-REQ) may be determined, based on the associated performance requirement and the associated subnet characteristics. In an embodiment, the NESTC-SS 212 may also determine the SUBNET-CHAR for each network slice subnet based on the service requirement set and policy or the one or more provisioned rules. The NESTC-SS 212 may then combine the SUBNET-PERF-REQ and the SUBNET-CHAR to form a SLICE-SUB-NET-REQ for each subnet that is specified as part of the network slice template provided by the template controller 140. The dimensions of the slice subnet, for example, user density, geographical area may be appropriately placed within the SUBNET-PERF-REQ or the SUBNET-CHAR, or they may be a part of the subnet dimension, which is then also included in the SLICE-SUB-NET-REQ.

At step 630, a check is performed to determine, for each of the network slice subnets in the network slice template hierarchy, whether resource sharing is allowed based on analysis of the slice subnet requirement to determine reuse of existing network slice subnet instances. If, for in any of the network slice subnets in the network slice template hierarchy, resource sharing is not allowed, at step 632, a new slice subnet instance is created for those network slice subnets which do not allow resource sharing. In an embodiment, let us consider that the RAN subnet includes Fronthaul subnet, Midhaul subnet and RAN network functions subnet (the RAN network functions subnet, for example, include one or more Centralized Units (CU), one or more Distributed Units (DU), and one or more Remote Units(s) (RU)). In such a scenario, at Step 632, when the NESTC-SS 212 may decide to create a new slice subnet instance for the RAN subnet. Thereafter, the sequence of steps starting from the step 624 to 632 may be repeated to determine whether to reuse an existing slice subnet instance or to create a new slice subnet in each of Fronthaul subnet, Midhaul subnet, and RAN network functions subnet (which are constituents of the RAN subnet). Further, the steps elaborated in FIG. 10 to determine if an existing slice subnet instance may be reused, may be applied for each of Fronthaul subnet, Midhaul subnet and RAN network functions subnet.

However, if, for one or more of the network slice subnets in the network slice template hierarchy, resource sharing is allowed, at step 634, a check is performed to determine if one or more of the existing slice subnet instances are suitable for reuse. If none of the existing slice subnet instances are suitable for reuse, the control moves to step 632. Thus, the one or more new slice subnet instance may be created, when at least one condition is satisfied. The at least one condition includes at least one of resource sharing being disallowed in the slice subnet requirement or non-suitability of reuse of the at least one of existing network slice subnet instances. In an embodiment, in case of any issues including infeasibility to create a new network slice subnet instance, or to scale or modify a new network slice subnet instance, etc, during the creation of a new network slice instance, the NSLO-SS 210 may opt for the next best solution option provided by the NESTC-SS 212 (for example, choose a network slice subnet instance with the second best ADJUSTED-SUBNET-SUITABILITY-SCORE). The ADJUSTED-SUBNET-SUITABILITY-SCORE has been explained in detail in conjunction with the FIG. 13.

Referring back to step 634, if one or more of the existing slice subnet instances are suitable for reuse, at step 636, the one or more of the existing slice subnet instances are suitable for reused. This is further explained in detail in conjunction with FIG. 10.

Figure 7:
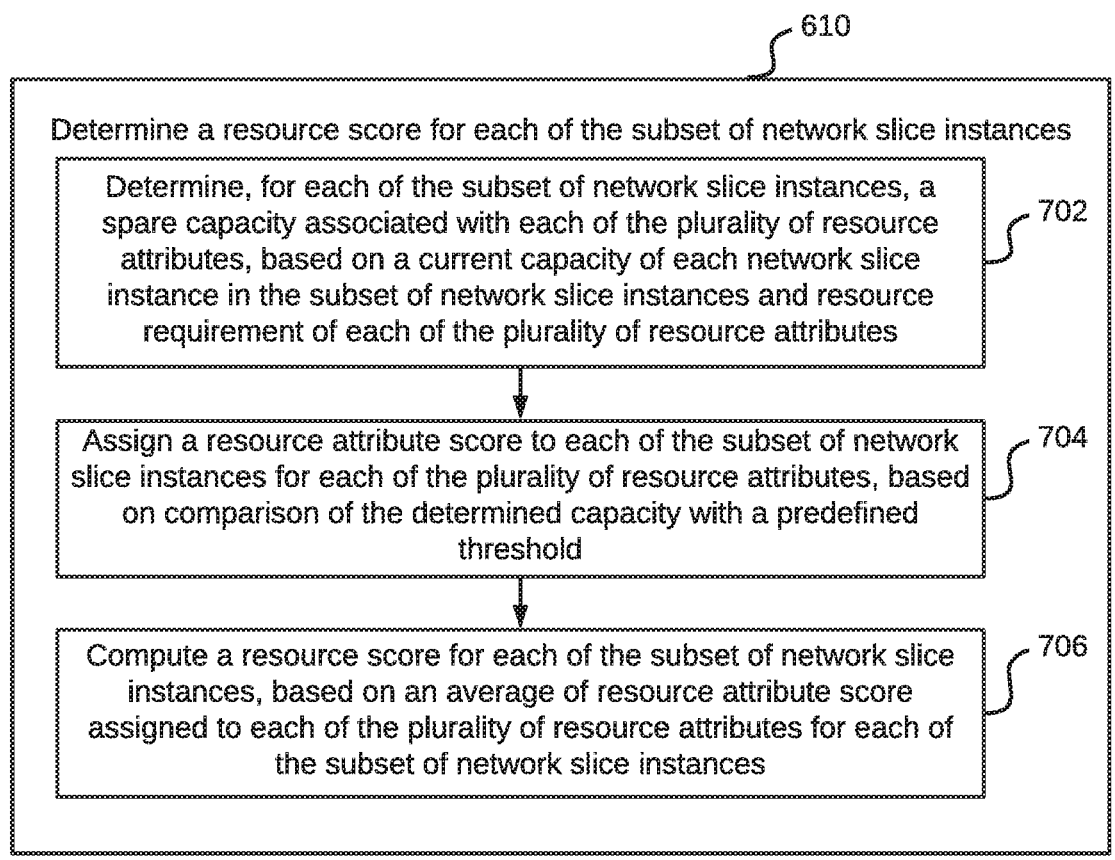
FIG. 7 is a flowchart of a method for determining a resource score for each of a subset of network slice instances, in accordance with an embodiment.

Referring now to FIG. 7, a flowchart of a method for determining a resource score for each of a subset of network slice instances is illustrated, in accordance with an embodiment. At step 702, for each of the subset of network slice instances, a spare capacity associated with each of the plurality of resource attributes is determined, based on a current capacity of each network slice instance in the subset of network slice instances and resource requirement of each of the plurality of resource attributes. In an embodiment, the NESTC-SS 212 also checks relevant attributes of the service requirement set (which may be part of service dimension and/or SRV-PERF-REQ) that directly impact resource allocation levels based on the volume of users and/or traffic (for example, user density, activity factor (active users of the service on average), connection density, throughput per slice). The NESTC-SS 212 also compares the spare capacity in the network slice instance to see if it is sufficient. The spare capacity in the network slice instance is determined by checking the current resource usage/occupancy levels of the network slice instance (relevant information stored in the SSNR-IN 216), as well as by requesting the ACF-SS 204 on the predicted usage/occupancy levels, and comparing the resources available for the network slice instance (either by querying the SSNR-IN 216 or the RESO-SS 206).

At step 704, a resource attribute score (RES-SCORE-ATTRIB) is assigned to each of the subset of network slice instances for each of the plurality of resource attributes, based on comparison of the determined capacity with a predefined threshold. In an embodiment, a RES-SCORE-ATTRIB is assigned by ascertaining the difference between 'spare' capacity and resources (for that attribute) required as specified in the service requirement set for the new slice request. By way of an example of calculation of the 'spare' capacity for an attribute, for a network slice instance, the current active users are assumed to be 5000 and the capacity is assumed to be 6000 active users. Thus, 'Spare' capacity is (6000-5000), i.e., 1000 active users. The RES-SCORE-ATTRIB may be assigned as follows for each resource attribute (for example, connection density, throughput per slice). In one scenario, when the difference is greater than or equal to a Resource Minimum Threshold Attribute (RES-MIN-THR-ATTRIB), then the RES-SCORE-ATTRIB is assigned as 1. In another scenario, when the difference is greater than 0 but less than the RES-MIN-THR-ATTRIB, then the RES-SCORE-ATTRIB is assigned as 0.75. In yet another scenario, when the difference is less than 0 (i.e., the resources required for the new service requirement set is more than the 'spare' capacity), then the RES-SCORE-ATTRIB is assigned as 0.4.

In an alternate embodiment, a more complex approach for computing 'spare' capacity may be implemented. By way of an example, for a network slice instance, current active users may be assumed as 5000 and the capacity may be assumed as 6000 active users. Additionally, resources used for 5000 users may be assumed as 'a,' where 'a,' for example, may be CPU, bandwidth, etc. Now, if a new request asks for 'm' users, in this approach, the resources that will be required will be 'm'*'a'/5000.

In an embodiment, for each network slice instance that has 'spare' capacity less than the RES-MIN-THR-ATTRIB for one or more RES-SCORE-ATTRIB, the NESTC-SS 212 may check the feasibility to scale up the required resources to fulfill the relevant aspects of the requirements specified in the service requirement set for that attribute. This is done by checking the relevant data stored in SSNR-IN 216 (which may have been provisioned, policy-driven and/or determined by the capacity limits of the different subnetworks. This information may also be provided by the controller or orchestrator managing the sub-network (for example, a Software Defined Networking (SDN) controller, or a Network Function Virtualization Orchestrator (NFVO)), or by checking with the RESO-SS 206. Based on the feasibility to scale, the RES-SCORE-ATTRIB for each attribute may be adapted. By way of an example, the RES-SCORE-ATTRIB may be adapted as follows. Considering that scaling is feasible. The RES-SCORE-ATTRIB is adjusted by a factor omega, if value of the RES-SCORE-ATTRIB is not 1 (if value of the RES-SCORE-ATTRIB is 1 already, no adjustment is done). Considering that scaling is not feasible. The RES-SCORE-ATTRIB is made '0' if the earlier score was 0.4 (in the example shown above), otherwise it is adjusted by a factor theta. The values of omega and theta may be in the range of 0 to 0.5.

At step 706, a RES-SCORE is computed for each of the subset of network slice instances, based on an average of resource attribute score assigned to each of the plurality of resource attributes for each of the subset of network slice instances. By way of an example, the NESTC-SS 212 may compute the RES-SCORE as follows. If the RES-SCORE-ATTRIB for any resource is '0', the RES-SCORE is made 0. This is to indicate insufficient resources in the existing network slice instance to cater to the new service requirement set (even after considering scaling). Otherwise, the RES-SCORE may be computed as an average (a simple or weighted) of the individual RES-SCORE-ATTRIB values to arrive at the final RES-SCORE.

Figure 8:
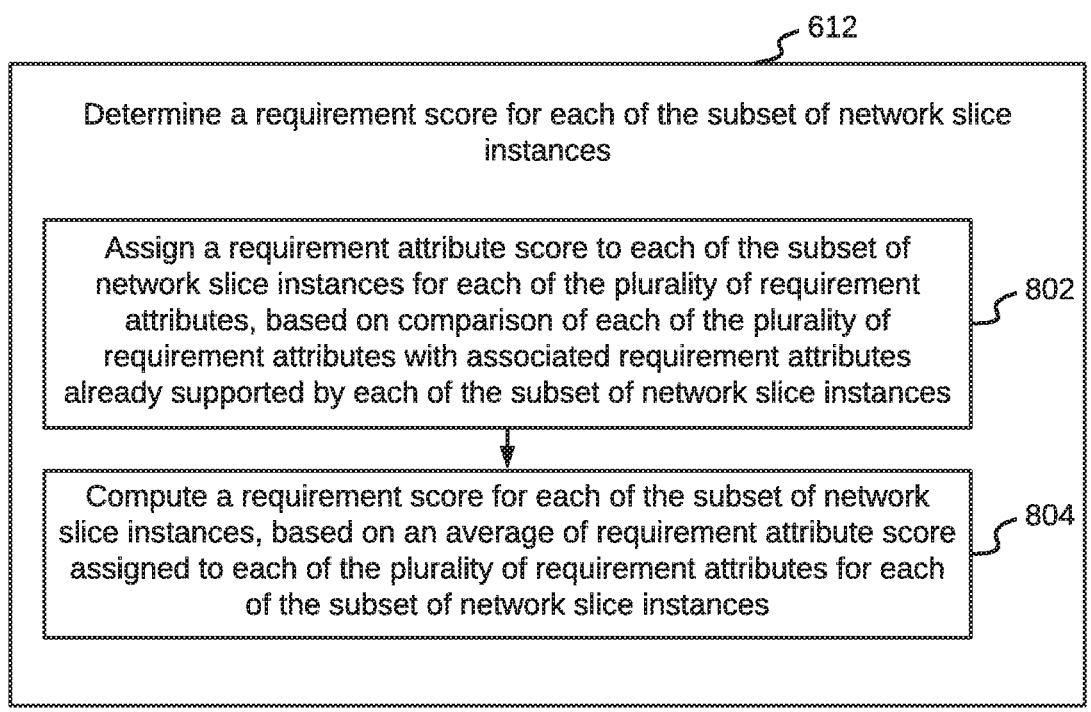
FIG. 8 is a flowchart of a method for determining a requirement score for each of a subset of network slice instances, in accordance with an embodiment.

Referring now to FIG. 8, a flowchart of a method for determining a REQ-SUIT-SCORE for each of a subset of network slice instances is illustrated, in accordance with an embodiment. At step 802, a requirement attribute score (REQ-SUIT-SCORE-ATTRIB) is assigned to each of the subset of network slice instances for each of the plurality of requirement attributes, based on comparison of each of the plurality of requirement attributes with associated requirement attributes already supported by each of the subset of network slice instances. In an embodiment, for each network slice instance, the NESTC-SS 212 may check the feasibility to cater to the SRV-PERF-REQ, such as, latency, throughput per User Equipment (UE), etc., by comparing values of relevant attributes in SRV-PERF-REQ and the values of corresponding attributes in each of the service requirement sets currently supported by the network slice instance.

Based on the evaluation, the NESTC-SS 212 may assign a REQ-SUIT-SCORE-ATTRIB, for each relevant attribute. By way of an example of such assignment, if the network slice instance already supports a service requirement set, which has the value of that attribute "better" than or "equal to" the value in the new service requirement set ("better" may be less than, for example, in case of latency, or greater than, for example, in case of throughput, so it is dependent on the attribute type), then REQ-SUIT-SCORE-ATTRIB is set to 1. By way of another example of such assignment, if the network slice instance supports a service requirement set, which has the value of that attribute "worse" than the value in the new service requirement set ("worse" may be greater than, for example, in case of latency, or less than, for example, in case of throughput, so it is dependent on the attribute type), and the difference is less than a Requirement Suitability Score Threshold (REQ-SUIT-SCORE-THR) (for example, 20%), then REQ-SUIT-SCORE-ATTRIB is set to 0.75, otherwise the REQ-SUIT-SCORE-ATTRIB is set to 0.4.

For example, consider a particular network slice instance, that supports two services whose service requirement sets indicate latency requirement of say, 20 milliseconds and 30 milliseconds respectively. Now, if the new service requirement set for which a suitable network slice instance is being evaluated by the NESTC-SS 212 specifies a latency requirement of say, 24 milliseconds, then the REQ-SUIT-SCORE-ATTRIB for latency requirement attribute will be 1. However, if the new service requirement set, for which a suitable network slice instance is being evaluated by the NESTC-SS 212 specifies a latency requirement of say, 19 milliseconds, then the REQ-SUIT-SCORE-ATTRIB for latency requirement attribute will be 0.75.

At step 804, a requirement score is computed for each of the subset of network slice instances, based on an average of requirement attribute score assigned to each of the plurality of requirement attributes for each of the subset of network slice instances. In an embodiment, the REQ-SUIT-SCORE-ATTRIB for each attribute is then 'adjusted' based on the actual performance trends (by obtaining inputs from the SLSRVMON-SS 208), i.e., based on dynamic network conditions. Such adjustment could be, for example, a weighted adjustment (reducing/increasing) of the REQ-SUIT-SCORE-ATTRIB, which is proportionate to the percentage of difference between the value to be supported versus the actual value based on performance trends. Finally, the REQ-SUIT-SCORE is computed as an average (which may be a simple or weighted average (with weights being assigned based on relative importance of each attribute depending on the slice type as provided by pre-provisioned inputs) of all the adjusted REQ-SUIT-SCORE-ATTRIB values. It may be noted that the REQ-SUIT-SCORE-ATTRIB-THR may be the same for all attributes or different for different attributes.

Figure 9:
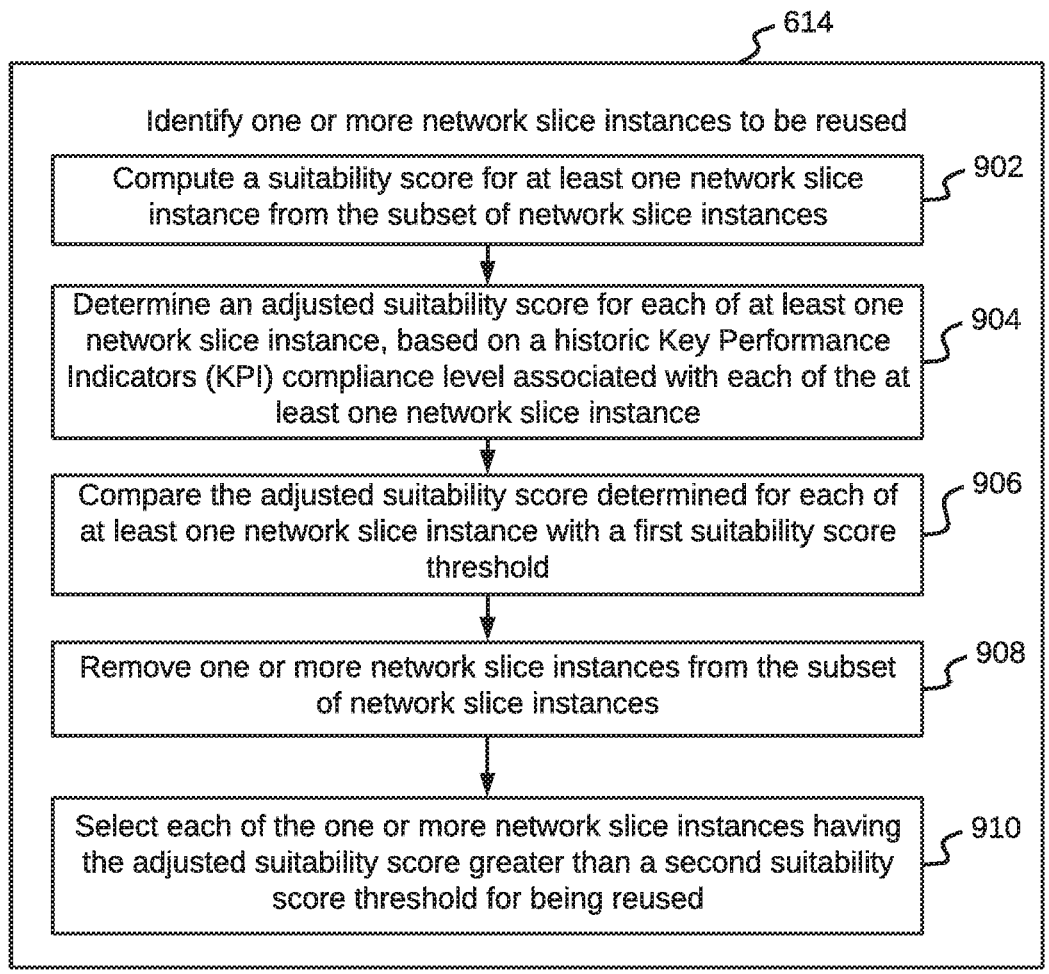
FIG. 9 is a flowchart of a method for identifying one or more network slice instances from a subset of network slice instances to be reused, in accordance with an embodiment.

Referring now to FIG. 9, a flowchart of a method for identifying one or more network slice instances from a subset of network slice instances that can be reused is illustrated, in accordance with an embodiment. The steps of this method are explained in reference to FIGS. 6A, 6B, 7, and 8. At step 902, a suitability score is computed for at least one network slice instance from the subset of network slice instances. Each of the at least one network slice instance has a resource score greater than zero. The suitability score for a network slice instance from the at least one network slice instance is determined based on the associated resource score and the associated requirement score. In an embodiment, the NESTC-SS 212 may remove all those network slice instances whose RES-SCORE is 0, from the EXIST-NS-INST-CAND-LIST. The NESTC-SS 212 may then assign a suitability score for each of the remaining network slice instances in the EXIST-NS-INST-CAND-LIST (whose RES-SCORE is greater than 0). By way of an example, the suitability score may be determined using the equation 1 given below:

$$\text{SUITABILITY-SCORE} = (\text{alpha} * \text{RES-SCORE}) + (\text{beta} * \text{REQ-SUIT-SCORE}) \qquad (1)$$

where, alpha and beta are weights which may be provisioned by the operator and auto-adapted subsequently by the SLSRVMON-SS 208.

At step 904, an adjusted suitability score (ADJUSTED-SUITABILITY-SCORE) is determined for each of at least one network slice instance, based on a historic KPI compliance level associated with each of the at least one network slice instance. In an embodiment, the NESTC-SS 212 may then check with the ACF-SS 204 regarding appropriateness of reusing such network slice instances, based on historical data of same or similar services running on the same or similar slice. For example, such an appropriateness check may be based on SLA/KPI compliance level of the service. The NESTC-SS 212 may then compute the ADJUSTED-SUITABILITY-SCORE. By way of an example, the ADJUSTED-SUITABILITY-SCORE may be computed based on equation 2 given below:

$$\text{ADJUSTED-SUITABILITY-SCORE} = \text{SUITABILITY-SCORE} * \text{gamma} \qquad (2)$$

In the equation 2, gamma may be proportionate to the SLA/KPI compliance level. For example, gamma may be equal to 1, if SLA/KPI compliance level is more than 98%, 0.9 if SLA/KPI compliance level is <=98% and >95%, 0.8 if SLA/KPI compliance level is <=95% and >90%, 0.7 if SLA/KPI compliance level is <=90% and >85%, and 0 otherwise. Further, if there are no exact match of an earlier slice and/or service, the appropriateness check may be done on the closest match in terms of KPIs and characteristics of similar slice and/or service respectively. The ACF-SS 204 may also return a 'no match' if the match is less than MATCH-LOWER-THR, in which case the SUITABILITY-SCORE will simply be taken as the ADJUSTED-SUITABILITY-SCORE (i.e., no adjustment is done).

At step 906, the ADJUSTED-SUITABILITY-SCORE determined for each of at least one network slice instance is compared with a first suitability score threshold (SUITABILITY-SCORE-LOWER-THR). In an embodiment, the NESTC-SS 212 may compare ADJUSTED-SUITABILITY-SCORE of each network slice instance that is remaining in the EXIST-NS-INST-CAND-LIST after above steps, with the SUITABILITY-SCORE-LOWER-THR. If the ADJUSTED-SUITABILITY-SCORE is below the SUITABILITY-SCORE-LOWER-THR, the network slice instance may not be considered as candidate for reuse. The remaining candidates are then sorted in descending order of the ADJUSTED-SUITABILITY-SCORES.

At step 908, one or more network slice instances are removed from the subset of network slice instances whose adjusted suitability score for each of the one or more network slice instances is below the first suitability score threshold. Thereafter, at step 910, each of the one or more network slice instances having the adjusted suitability score greater than a second suitability score threshold (SUITABILITY-SCORE-UPPER-THR) are selected for being reused. A network slice instance from the one or more network slice instances having the highest adjusted suitability score is selected to be reused. In an embodiment, if there is feasibility to reuse an existing network slice instance as determined by the above steps, and, if the ADJUSTED-SUITABILITY-SCORE is greater than the SUITABILITY-SCORE-UPPER-THR for one or more network slice instances, the NESTC-SS 212 may decide to stop further processing to determine appropriate network slice instance, and return the details of the one or more network slice instances (to the NSLO-SS 210) whose ADJUSTED-SUITABILITY-SCORE is greater than the SUITABILITY-SCORE-UPPER-THR. Otherwise, the NESTC-SS 212 may request the POPR-SS 202 as to whether the NESTC-SS 212 may look for further options and then determine the most appropriate choice or stop further determination of appropriate options (i.e., whether it is required to evaluate further options, for example, to create a new network slice instance, or not). If the POPR-SS 202 specifies that network slice shell hierarchy may be determined with other options, or if there are no appropriate network slice instances determined, the NESTC-SS 212 may create a new network slice instance. This has already been explained in detail in conjunction with FIG. 6B.

Figure 10:
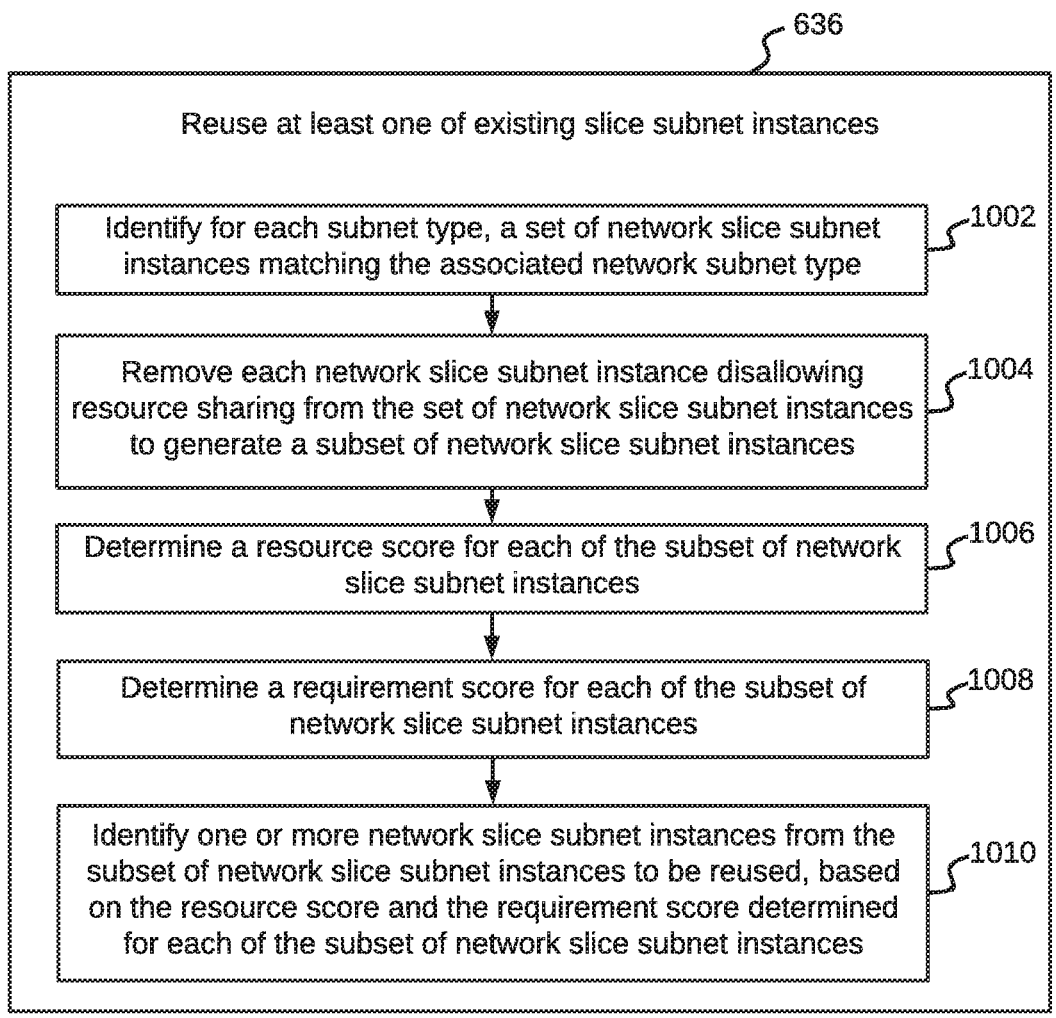
FIG. 10 is a flowchart of a method for reusing at least one of existing slice subnet instances for each of network slice subnets in the network slice template hierarchy, in accordance with an embodiment.

Referring now to FIG. 10, a flowchart of a method for reusing one or more of existing slice subnet instances for each of network slice subnets in the network slice template hierarchy is illustrated, in accordance with an embodiment. At step 1002, for each subnet type (e.g., RAN) a set of network slice subnet instances (EXIST-NSS-INST-CAND-LIST) matching the associated network subnet type are identified. In an embodiment, the NESTC-SS 212 may determine if there are any appropriate network slice subnet instances of the same subnet type (for example, in case of RAN subnet, RAN network slice subnet instances) that can be reused. The NESTC-SS 212 checks if there are any network slice subnet instances, which have the same or "similar" network slice subnet template as what was provided by the template controller 140 for the current service requirement set. "Similar" may refer to a case where the performance requirement attributes such as latency in the network slice subnet template provided by the template controller 140 has overlapping value ranges in the network slice subnet template of the network slice subnet instance under consideration. An additional check could be to see if the value of the attribute (for example, latency) in subnet performance requirement (SUBNET-PERF-REQ) is within the value range of the corresponding attribute (for example, latency) in the network slice subnet template of the network slice subnet instance under consideration. "Similar" may also refer to a case where the subnet characteristics (SUBNET-CHAR) in the slice subnet requirement (SLICE-SUB-NET-REQ) is the same as specified in the network slice subnet template. The NESTC-SS 212 may then form the EXIST-NSS-INST-CAND-LIST with network slice subnet instances which have the same or "similar" network slice subnet templates as what was provided by the template controller 140 for the current service requirement set.

At step 1004, each network slice subnet instance disallowing resource sharing is removed from the set of network slice subnet instances to generate a subset of network slice subnet instances. In an embodiment, for each network slice subnet instance in the EXIST-NSS-INST-CAND-LIST, the NESTC-SS 212 may check if a network slice subnet instance allows sharing (as indicated in its properties) across the next level elements in the hierarchy. For example, in case of RAN slice subnet instance, the NESTC-SS 212 checks if sharing of the RAN slice subnet instance is allowed across multiple network slice instances. If sharing is allowed, then the network slice subnet instance is considered, otherwise it is removed from the EXIST-NSS-INST-CAND-LIST.

At step 1006, a resource score (SUBNET-RES-SCORE) is determined for each of the subset of network slice subnet instances. This is further explained in detail in conjunction with FIG. 11. At step 1008, a requirement score (SUBNET-REQ-SUIT-SCORE) is determined for each of the subset of network slice subnet instances. This is further explained in detail in conjunction with FIG. 12. At step 1010, one or more network slice subnet instances are identified from the subset of network slice subnet instances to be reused, based on the resource score and the requirement score determined for each of the subset of network slice subnet instances. This is further explained in detail in conjunction with FIG. 13.

Figure 11:
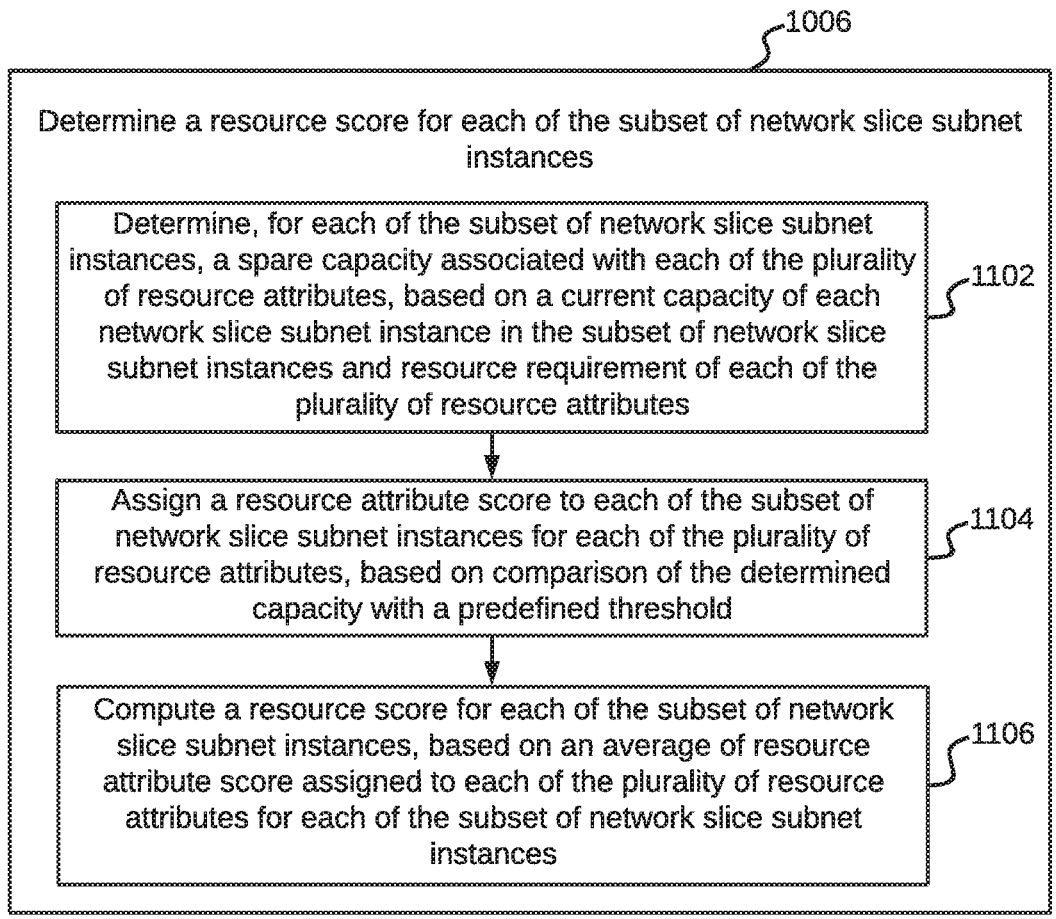
FIG. 11 is a flowchart of a method for determining a resource score for each of a subset of network slice subnet instances, in accordance with an embodiment.

Referring now to FIG. 11, a flowchart of a method for determining a resource score for each of a subset of network slice subnet instances is illustrated, in accordance with an embodiment. At step 1102, for each of the subset of network slice subnet instances, a spare capacity associated with each of the plurality of resource attributes is determined, based on a current capacity of each network slice subnet instance in the subset of network slice subnet instances and resource requirement of each of the plurality of resource attributes. In an embodiment, NESTC-SS 212 checks if the relevant attributes of the SLICE-SUB-NET-REQ which directly impacts resource allocation levels based on the volume of users and/or traffic (for example, user density, active sessions, uplink throughput of slice subnet) and compare the 'spare' capacity in the network slice subnet instance to see if it is sufficient. The 'spare' capacity is determined by checking the current resource usage or occupancy levels of the network slice subnet instance (relevant information stored in the SSNR-IN 216), as well as by requesting the ACF-SS 204 on the predicted usage or occupancy levels and comparing the available resources. Sometimes, the current resource usage or occupancy levels or predicted trend of the network slice subnet instance may have to be requested to the domain controllers or orchestrators managing the particular subnet.

At step 1104, a resource attribute score (SUBNET-RES-SCORE-ATTRIB) is assigned to each of the subset of network slice subnet instances for each of the plurality of resource attributes, based on comparison of the determined capacity with a predefined threshold. In an embodiment, a SUBNET-RES-SCORE-ATTRIB is assigned by ascertaining the difference between 'spare' capacity and resources (for that attribute) required as specified in the SLICE-SUB-NET-REQ for the new slice subnet request. For example, the SUBNET-RES-SCORE-ATTRIB may be assigned as follows for each resource attribute (for example, number of active sessions, throughput at slice subnet level). When the difference is greater than a SUBNET-RES-MIN-THR-ATTRIB, then SUBNET-RES-SCORE-ATTRIB is assigned as 1. When the difference is greater than 0 but less than or equal to a SUBNET-RES-MIN-THR, then SUBNET-RES-SCORE-ATTRIB is assigned as 0.7. However, when the difference is less than 0 (i.e., the resources required for the new SLICE-SUB-NET-REQ is more than the 'spare' capacity), then SUBNET-RES-SCORE-ATTRIB is assigned as 0.3.

For each network slice subnet instance, which has 'spare' capacity less than SUBNET-RES-MIN-THR-ATTRIB for one or more SUBNET-RES-SCORE-ATTRIB, the NESTC-SS 212 checks the feasibility to scale up the required resources to fulfill the relevant aspects of the requirements specified in the SUBNET-PERF-REQ (within SLICE-SUB-NET-REQ) for that attribute. This is done by checking the relevant data stored in the SSNR-IN 216 (which may have been provisioned, and/or determined by the capacity limits of the different sub-networks; this information may also be provided by the controller/orchestrator managing the sub-network (for example, a domain controller or domain orchestrator)). Based on the feasibility to scale, the SUBNET-RES-SCORE-ATTRIB for each attribute may be adapted as follows. If scaling is feasible, SUBNET-RES-SCORE-ATTRIB is adjusted by a factor epsilon, if its value is not 1 (if its value is 1 already, no adjustment is done). However, if scaling is not feasible, SUBNET-RES-SCORE-ATTRIB is made '0' if the earlier score was 0.4, otherwise it is adjusted by a factor zeta. Epsilon and zeta have values in the range 0 to 0.5.

At step 1106, a resource score (SUBNET-RES-SCORE) is computed for each of the subset of network slice subnet instances, based on an average of resource attribute score assigned to each of the plurality of resource attributes for each of the subset of network slice subnet instances. In an embodiment, the NESTC-SS 212 may then compute the SUBNET-RES-SCORE. By way of an example, the SUBNET-RES-SCORE may be computed as follows. If the SUBNET-RES-SCORE-ATTRIB for any resource is '0', the SUBNET-RES-SCORE is made '0'. This is to indicate insufficient resources in the existing network instance to cater to the new service requirement set (even after considering scaling). Otherwise, the SUBNET-RES-SCORE may be computed as an average (a simple or weighted) of the individual SUBNET-RES-SCORE-ATTRIB values to arrive at the final SUBNET-RES-SCORE.

Figure 12:
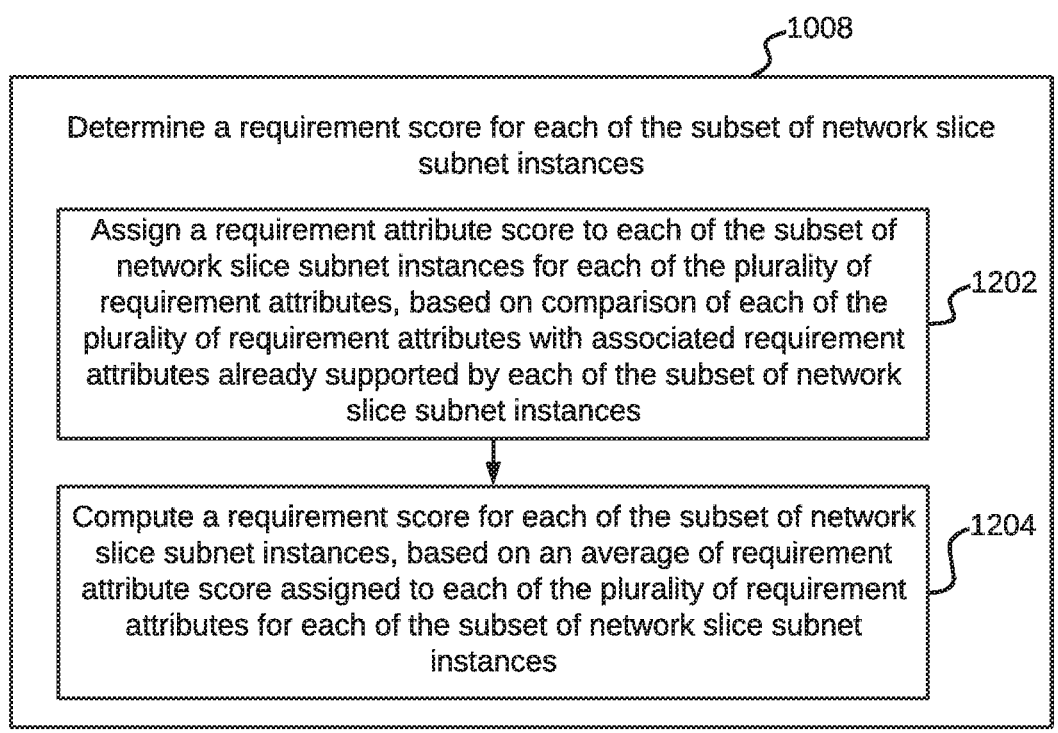
FIG. 12 is a flowchart of a method for determining a requirement score for each of the subset of network slice subnet instances, in accordance with an embodiment.

Referring now to FIG. 12, a flowchart of a method for determining a requirement score for each of the subset of network slice subnet instances is illustrated, in accordance with an embodiment. At step 1202, a requirement attribute score (SUBNET-REQ-SUIT-SCORE-ATTRIB) is assigned to each of the subset of network slice subnet instances for each of the plurality of requirement attributes, based on comparison of each of the plurality of requirement attributes with associated requirement attributes already supported by each of the subset of network slice subnet instances. In an embodiment, for each network slice instance, the NESTC-SS 212 may check the feasibility to cater to the SRV-PERF-REQ such as latency, throughput per UE, etc., by comparing the values of the relevant attributes in SUBNET-PERF-REQ and the values of the corresponding attributes in the SUB-NET-PERF-REQ within each of the SLICE-SUB-NET-REQ currently supported by the network instance.

Based on the evaluation, the NESTC-SS 212 may assign a SUBNET-REQ-SUIT-SCORE-ATTRIB, for each relevant attribute. By way of an example, If the N-S subnet instance already supports a SUBNET-PERF-REQ which has the value of that attribute "better" than or "equal to" the value in the new SUBNET-PERF-REQ ("better" may be less than, for example, in case of latency, or greater than, for example, in case of throughput; so it is dependent on the attribute type), then SUBNET-REQ-SUIT-SCORE-ATTRIB is set to 1.

By way of another example, If the network slice subnet instance supports a SUBNET-PERF-REQ, which has the value of that attribute "worse" than the value in the new SUBNET-PERF-REQ ("worse" may be greater than, for example, in case of latency, or less than, for example, in case of throughput; so it is dependent on the attribute type), the NESTC-SS 212 may performs the following actions. If the difference between the attribute value in the (best) SUB-NET-PERF-REQ supported by the slice subnet instance under consideration and the value in the new SUBNET-PERF-REQ is less than a SUBNET-REQ-SUIT-SCORE-THR (say 20%), then the NESTC-SS 212 may check for the feasibility of scaling up appropriate resources (which are determined based on provisioned rules which may be self-adapted by the SLSRVMON-SS 208) (and perhaps scaling down others as needed) by checking with the RESO-SS 206, such that, the difference in attribute value requested and already supported by the slice subnet instance under consideration can be reduced. By way if an example, if latency attribute value for a core network slice subnet is required to be 20 ms, however, the network slice subnet instance under consideration supports 23 ms. Based on provisioned rules, the NESTC-SS 212 may check if the resource occupancy level of a key network function (for example, SMF) is high (by checking with SLSRVMON-SS 208), then the NESTC-SS 212 may check with the RESO-SS 206 if that network function can be scaled up (for example, at the network edge), which will help to lower the latency.

If it is feasible to scale, then the SUBNET-REQ-SUIT-SCORE-ATTRIB is set to 0.8, otherwise the NESTC-SS 212 may check with the RESO-SS 206, if the allocation of relevant resources (determined based on provisioned rules) can be adapted suitably. In the above example, the NESTC-SS 212 may check with the RESO-SS 206, if resources may be allocated in such a way that the core subnet latency is <20 ms for the network slice subnet instance under consideration. The RESO-SS 206 may then check re-allocation of resources for the network slice subnet instance, for example, more resources at the edge data center than at the regional data center to avoid transmission delays.

If the resource allocation can be adapted (as provided by the RESO-SS 206), then the SUBNET-REQ-SUIT-SCORE-ATTRIB is set to 0.7. Otherwise, the SUBNET-REQ-SUIT-SCORE-ATTRIB is set to 0.5. If the difference between the attribute value in the (best) SUBNET-PERF-REQ supported and the value in the new SUBNET-PERF-REQ is greater than or equal to a SUBNET-REQ-SUIT-SCORE-THR (say 20%), then the SUBNET-REQ-SUIT-SCORE-ATTRIB is set to 0.2.

The SUBNET-REQ-SUIT-SCORE-ATTRIB for each attribute may then be 'adjusted' by the NESTC-SS 212 based on the actual performance trends and predicted trend (by obtaining input from the SLSRVMON-SS 208 and the ACF-SS 204 respectively, or from the domain controller/orchestrator managing the subnet), i.e., based on the dynamic network conditions. Such adjustment could be, for example, a weighted adjustment (reducing/increasing) of the SUBNET-REQ-SUIT-SCORE-ATTRIB, proportionate to the percentage of difference between the value to be supported versus the actual value based on current and predicted performance trends.

At step 1204, a requirement score (SUBNET-REQ-SUIT-SCORE) is computed for each of the subset of network slice subnet instances, based on an average of requirement attribute score assigned to each of the plurality of requirement attributes for each of the subset of network slice subnet instances. In an embodiment, the SUBNET-REQ-SUIT-SCORE may be computed as an average (which may be a simple or weighted average, with weights being assigned based on relative importance of each attribute depending on the slice type as provided by pre-provisioned inputs) of all the adjusted SUBNET-REQ-SUIT-SCORE-ATTRIB values. It may be noted that the SUBNET-REQ-SUIT-SCORE-ATTRIB-THR may be the same for all attributes or different for different attributes.

Figure 13:
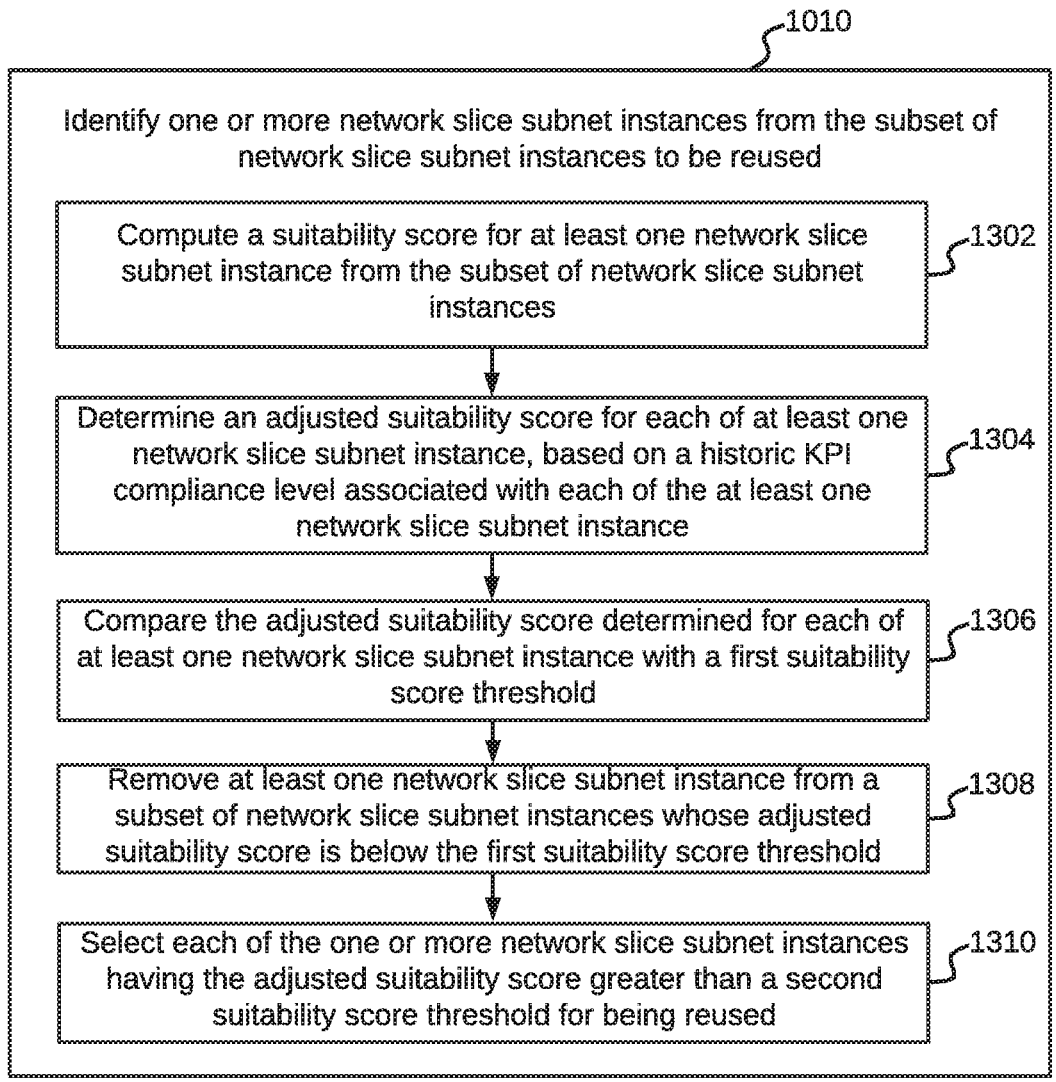
FIG. 13 is a flowchart of a method for identifying one or more network slice subnet instances from a subset of network slice subnet instances to be reused, in accordance with an embodiment.

Referring now to FIG. 13, a flowchart of a method for identifying one or more network slice subnet instances from a subset of network slice subnet instances to be reused is illustrated, in accordance with an embodiment. At step 1302, a suitability score (SUBNET-SUITABILITY-SCORE) is computed for at least one network slice subnet instance from the subset of network slice subnet instances. Each of the at least one network slice subnet instance has a resource score greater than zero, and wherein the suitability score for a network slice subnet instance from the at least one network slice subnet instance is determined based on the associated resource score and the associated requirement score. In an embodiment, the NESTC-SS 212 may removes all those network slice subnet instances whose SUBNET-RES-SCORE is 0 from the EXIST-NSS-INST-CAND-LIST, and then the NESTC-SS 212 assigns a SUBNET-SUITABIL-ITY-SCORE for each of the network slice subnet instances whose SUBNET-RES-SCORE is greater than 0. The SUB-NET-SUITABILITY-SCORE, for example, may be computed using equation 3 given below:

$$\text{SUBNET-SUITABILITY-SCORE} = \\ (\text{lambda} * \text{SUBNET-RES-SCORE}) + \\ (\text{phi} * \text{SUBNET-REQ-SUIT-SCORE}) \quad (3)$$

In the equation 3, lambda and phi are weights, which may be provisioned by the operator and auto-adapted subsequently by the SLSRVMON-SS 208. At step 1304, an adjusted suitability score (ADJUSTED-SUBNET-SUIT-ABILITY-SCORE) is determined for each of at least one network slice subnet instance, based on a historic KPI compliance level associated with each of the at least one network slice subnet instance. In an embodiment, the NESTC-SS 212 may check with the ACF-SS 204 regarding the appropriateness of reusing such a network slice subnet instance based on historical data of same or similar network slice instances mapped to the network slice subnet instance. For example, such an appropriateness check may be based on compliance level of the network slice subnet instance to the SUBNET-PERF-REQ. The NESTC-SS 212 may compute the ADJUSTED-SUBNET-SUITABILITY-SCORE, for example, based on equation 4 given below:

$$\text{ADJUSTED-SUBNET-SUITABILITY-SCORE} = \text{SUITABILITY-SCORE} * \text{chi} \quad (4)$$

In the equation 4, chi may be proportionate to the SUB-NET-PERF compliance level, for example, chi is equal to 1, if the SUBNET-PERF compliance level is more than 98%, 0.9 if the SUBNET-PERF compliance level is <=98% and >90%, 0.7 if the SUBNET-PERF compliance level is <=90% and >75%, 0.5 if the SUBNET-PERF compliance level is <=75% and >60%, and 0 otherwise. If there are no exact match of an earlier slice and/or service, the appropriateness check may be skipped (in which case the SUBNET-SUITABILITY-SCORE will simply be taken as the ADJUSTED-SUBNET-SUITABILITY-SCORE, i.e., no adjustment is done), or it may be done on the closest matching one or more network slice instances by comparing the characteristics (i.e., having matching service characteristics).

At step 1306, the adjusted suitability score determined for each of at least one network slice subnet instance is compared with a first suitability score threshold (SUBNET-SUITABILITY-SCORE-LOWER-THR). At step 1308, one or more network slice subnet instances from the subset of network slice subnet instances whose adjusted suitability score is below the SUBNET-SUITABILITY-SCORE-LOWER-THR are removed. At step 1310, each of the one or more network slice subnet instances having the adjusted suitability score greater than a second suitability score threshold (SUBNET-SUITABILITY-SCORE-UPPER-THR) are selected for being reused. In an embodiment, a network slice subnet instance from the one or more network slice subnet instances having the highest adjusted suitability score is selected to be reused.

In an embodiment, If there is feasibility to reuse an existing network slice subnet instance, and, if the ADJUSTED-SUBNET-SUITABILITY-SCORE is greater than the SUBNET-SUITABILITY-SCORE-UPPER-THR for at least one network slice subnet instance, the NESTC-SS 212 may decide to stop further processing to determine appropriate network slice subnet instance for that subnet. Otherwise, it may request the POPR-SS 202 as to whether it is required to evaluate creation of a new network slice subnet instance.

Further, the NESTC-SS 212 may request the RESO-SS 206 for feasibility to create a new network slice subnet instance by passing the SUBNET-REQ. The RESO-SS 206 checks for availability of appropriate resources for creating the new network slice subnet instance. Such check for availability of appropriate resources may be done by determining appropriate resources using provisioned rules, executing a sequence of pre-defined steps to determine the resources that would fulfill the SUBNET-REQ, using well-known techniques. Such check for availability of appropriate resources may also be done by determining feasibility of instantiating/scaling appropriate resources determined in above step by checking the spare capacity in the subnet. In this step, the RESO-SS 206 may also consider resource level sharing across network slice subnet instances (for example, a particular VNF may be shared across multiple network slice subnet instances, so it need not be instantiated newly; the same spectrum may be shared across multiple network slice subnet instances, so new spectrum need not be allocated). The RESO-SS 206 may determine this based on the sharing level information provided by the NESTC-SS 212 as part of the SUBNET-REQ. If resources are available, the RESO-SS 206 returns a success indication to the NESTC-SS 212.

The NESTC-SS 212 may then consolidate the details of one or more network slice subnet instances that can be reused for each subnet (i.e., those network slice subnet instances whose ADJUSTED-SUBNET-SUITABILITY-SCORE is greater than SUBNET-SUITABILITY-SCORE-UPPER-THR) along with details of the feasibility of creating a new network slice subnet instance for that subnet. It then sends all the details to the NSLO-SS 210 along with the SUBNET-REQ details for each subnet, and the details of the network slice subnet instances that can be reused with modification/scaling along with the details of the modification/scaling to be done.

Figure 14:
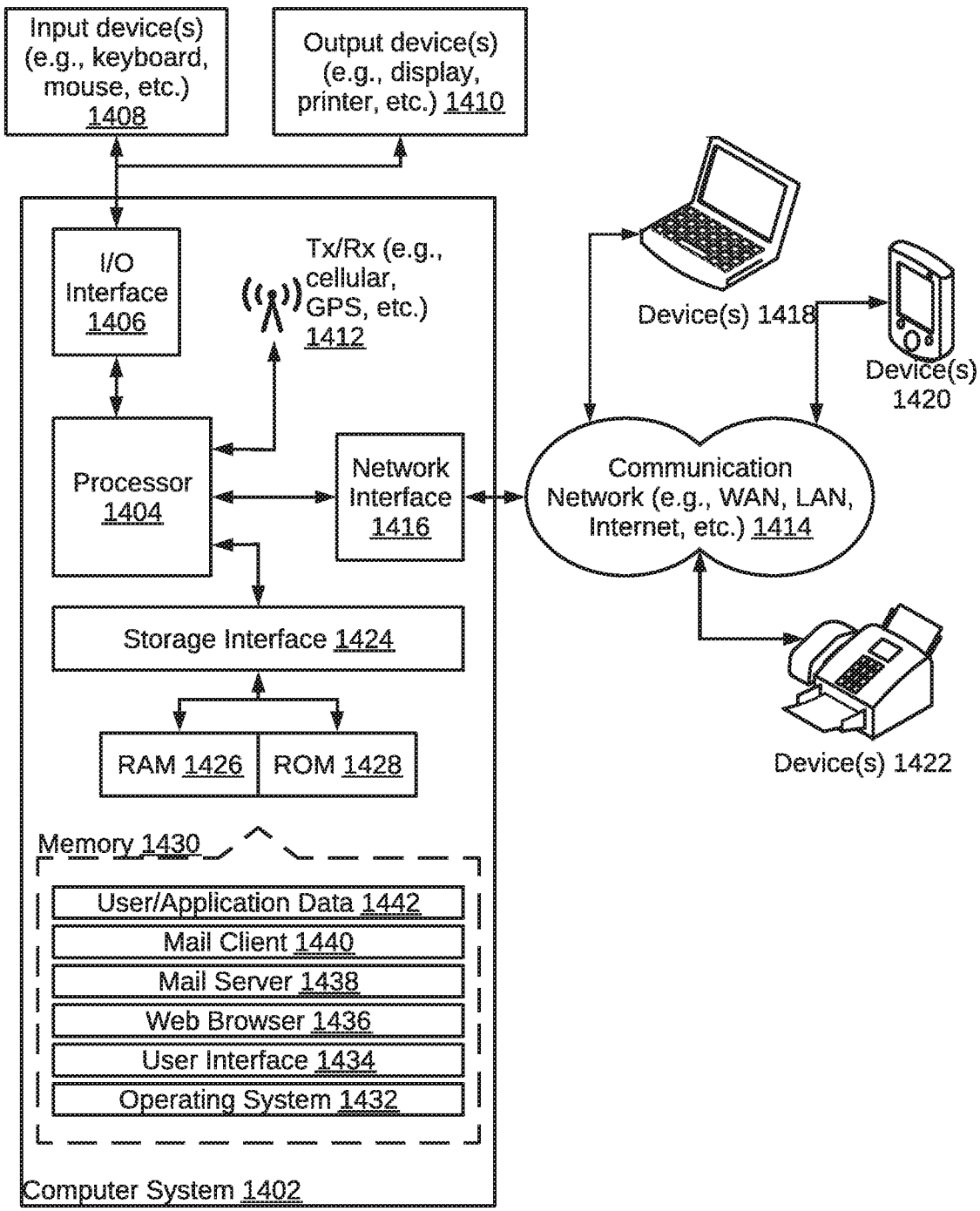
FIG. 14 illustrates a block diagram of an exemplary computer system for implementing various embodiments.

FIG. 14 is a block diagram of an exemplary computer system for implementing various embodiments. Computer system 1402 may include a central processing unit ("CPU" or "processor") 1404. Processor 1404 may include at least one data processor for executing program components for executing user- or system-generated requests. A user may include a person, a person using a device such as such as those included in this disclosure, or such a device itself. Processor 1404 may include specialized processing units such as integrated system (bus) controllers, memory management control units, floating point units, graphics processing units, digital signal processing units, etc. Processor 1404 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1404 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1404 may be disposed in communication with one or more input/output (I/O) devices via an I/O interface 1406. I/O interface 1406 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1406, computer system 1402 may communicate with one or more I/O devices. For example, an input device 1408 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1410 may be a printer, fax machine, video display (for example, cathode ray tube (CRT), liquid crystal display (LCD), light-emitting diode (LED), plasma, or the like), audio speaker, etc. In some embodiments, a transceiver 1412 may be disposed in connection with processor 1404. Transceiver 1412 may facilitate various types of wireless transmission or reception. For example, transceiver 1412 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1404 may be disposed in communication with a communication network 1414 via a network interface 1416. Network interface 1416 may communicate with communication network 1414. Network interface 1416 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1414 may include, without limitation, a direct interconnection, local area network (LAN), wide area network (WAN), wireless network (for example, using Wireless Application Protocol), the Internet, etc. Using network interface 1416 and communication network 1414, computer system 1402 may communicate with devices 1418, 1420, and 1422. These devices may include, without limitation, personal computer(s), server(s), fax machines, printers, scanners, various mobile devices such as cellular telephones, smartphones, tablet computers, eBook readers, or the like. In some embodiments, computer system 1402 may itself embody one or more of these devices.

In some embodiments, processor 1404 may be disposed in communication with one or more memory devices (for example, RAM 1426, ROM 1428, etc.) via a storage interface 1424. Storage interface 1424 may connect to memory 1430 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1430 may store a collection of program or database components, including, without limitation, an operating system 1432, user interface application 1434, web browser 1436, mail server 1438, mail client 1440, user/application data 1442 (for example, any data variables or data records discussed in this disclosure), etc. Operating system 1432 may facilitate resource management and operation of computer system 1402. Examples of operating systems 1432 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS' platform (XP, Vista/7/8, etc.), APPLE® IOS® platform, GOOGLE® ANDROID® platform, BLACKBERRY® OS platform, or the like. For example, user interfaces may provide computer interaction interface elements on a display system operatively connected to computer system 1402, such as cursors, icons, check boxes, menus, scrollers, windows, widgets, etc.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide method and system of template-based dynamic network slicing. The invention proposes a mechanism of most suitable network slice hierarchy formation for appropriate fulfilment of a service request while ensuring optimal use of network resources. This is achieved by appropriate service request interpretation and deriving each of service performance requirement, service characteristics, and resource requirements. Further, appropriate network slice template hierarchy is obtained that can suitably meet the service request. Suitability determination is performed at the network slice and the network slice subnet level including determining whether an existing network slice instance (without modification or with minimal modification) can be reused/shared to fulfill the service request, or if a new network slice instance should be formed.

Further, it is determining as to how a new network slice instance should be formed. This is achieved by first appropriately determining the slice subnet requirements for each slice subnet based on service request and service characteristics, creating or selecting an network slice instance shell, determining extent of reuse of underlying existing network slice subnet instance (from the same or different existing slice shell) (i.e., without modification or with minimal modification), and determining which network subnet instances should be formed newly.

The proposed method also includes suitable formation of network slice instance and network slice subnet instance, which are non-existing including resource allocation, preparation of most suitable hierarchy of network slice instance and network slice subnet instance for appropriate service request fulfilment, service request fulfilment assessment (i.e., service performance+network performance+resource accounting), taking appropriate preventive and corrective actions to improve service performance and efficient use of network resources both in short-term, i.e., in-session when the network slice and the service is active and in long-term, which involves tuning of rules, parameters and thresholds.

The specification has described method and system of template-based dynamic network slicing. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, a computer-readable storage medium may store instructions for execution by one or more processors, including instructions for causing the processor(s) to perform steps with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of template-based dynamic network slicing, the method comprising:
    creating, by a network slicing device, service requirement set associated with a service request based on a plurality of characteristics in the service request, wherein the service requirement set comprises service characteristics, service performance requirements, and service dimensions associated with the service request, and wherein a plurality of resource attributes and a plurality of requirement attributes are associated with the service requirement set;
    identifying, by the network slicing device, a network slice template hierarchy based on the service requirement set, wherein the network slice template hierarchy comprises information associated with at least one of suitable templates for end-to-end network slice, network slice subnets, and corresponding constituents;
    selecting, by the network slicing device, one of reusing one of at least one of existing network slice instance and creating a new network slice instance, based on the identified network slice template hierarchy and the service requirement set;
    instantiating, by the network slicing device, a service associated with the service request using one of the at least one of existing network slice instances and the new network slice instance;
    monitoring, by the network slicing device, the service and one of the at least one of existing network slice instances and the new network slice instance, in response to instantiating the service, wherein a result of the monitoring is used for detecting and fixing at least one issues identified during monitoring of instantiated service; and
    performing, by the network slicing device, adaptation of at least one threshold and at least one factor used to perform network slicing, based on the at least one issues identified.

2. The method of claim 1, further comprising receiving the service request, wherein the plurality of characteristics of the service request comprises at least one of a type of service, maximum number of users, associated geographical area.

3. The method of claim 1, wherein creating the service requirement set comprises:
    determining the service characteristics, wherein the determining the service characteristics further comprises:
        determining a type of service associated with the service request based on a service category extracted from a service type mapping table; and
        determining at least one characteristics based on at least one of the plurality of characteristics in the service request and an adapted service characteristics table;
    determining the service performance requirements based on at least one of the plurality of characteristics in the service request, determined type of service and an adapted performance requirements table, and wherein the service performance requirements comprise at least one of latency, guaranteed throughput per user, reliability, availability and their associated target values; and
    determining the service dimensions based on at least one of the plurality of characteristics in the service request, wherein the service dimensions comprises at least one a density, maximum number of users, capacity, throughput per slice, or at least one geographical location.

4. The method of claim 1, wherein selecting comprises determining if resource sharing is allowed based on analysis of the service requirement set to determine reuse of existing network slice instances.

5. The method of claim 4, wherein one of the at least one of existing network slice instances are reused, when resource sharing is allowed in the service requirement set, wherein selecting reuse of one of the at least one of existing network slice instance comprises:
    identifying a set of network slice instances matching the network slice template hierarchy to be reused;
    removing each network instance disallowing resource sharing from the set of network slice instances to generate a subset of network slice instances;
    determining a resource score for each of the subset of network slice instances;
    determining a requirement score for each of the subset of network slice instances; and
    identifying one of one or more network slice instances from the subset of network slice instances to be reused, based on the resource score and the requirement score determined for each of the subset of network slice instances.

6. The method of claim 5, wherein determining the resource score for each of the subset of network slice instances comprises:
determining, for each of the subset of network slice instances, a spare capacity associated with each of the plurality of resource attributes, based on a current capacity of each network slice instance in the subset of network slice instances and resource requirement of each of the plurality of resource attributes;
assigning a resource attribute score to each of the subset of network slice instances for each of the plurality of resource attributes, based on comparison of the determined capacity with a predefine threshold; and
computing a resource score for each of the subset of network slice instances, based on an average of resource attribute score assigned to each of the plurality of resource attributes for each of the subset of network slice instances.

7. The method of claim 6, wherein determining the requirement score for each of the subset of network slice instances comprises:
assigning a requirement attribute score to each of the subset of network slice instances for each of the plurality of requirement attributes, based on comparison of each of the plurality of requirement attributes with associated requirement attributes already supported by each of the subset of network slice instances; and
computing a requirement score for each of the subset of network slice instances, based on an average of requirement attribute score assigned to each of the plurality of requirement attributes for each of the subset of network slice instances.

8. The method of claim 7, wherein identifying the one or more network slice instances to be reused comprises:
computing a suitability score for at least one network slice instance from the subset of network slice instances, wherein each of the at least one network slice instance has a resource score greater than zero, and wherein the suitability score for a network slice instance from the at least one network slice instance is determined based on the associated resource score and the associated requirement score;
determining an adjusted suitability score for each of at least one network slice instance, based on a historic Key Performance Indicators (KPI) compliance level associated with each of the at least one network slice instance;
comparing the adjusted suitability score determined for each of at least one network slice instance with a first suitability score threshold;
removing one or more network slice instances from the at least one network slice instance, wherein the adjusted suitability score for each of the one or more network slice instances is below the first suitability score threshold; and
selecting each of the one or more network slice instances having the adjusted suitability score greater than a second suitability score threshold for being reused, wherein a network slice instance from the one or more network slice instances having the highest adjusted suitability score is selected to be reused.

9. The method of claim 4, wherein the new network slice instance is created, when at least one condition is satisfied, wherein the at least one condition comprises disallowance of resource sharing in the service requirement set or non-suitability of reuse of the at least one of existing network slice instances, wherein creating the new network slice instance comprises at least one of:
reusing at least one of existing slice subnet instances; and
creating at least one new slice subnet instances.

10. The method of claim 9, wherein creating the new network slice instance comprises:
determining a network slice shell hierarchy based on performance requirement and characteristics of each of the constituents in the network slice template hierarchy, wherein the network slice subnets in the network slice template hierarchy comprises at least one of a Radio Access Network (RAN) slice subnet, a transport slice subnet, a core slice subnet, and the associated subnet templates;
determining performance requirement for each of the network slice subnets based on the service requirement set and at least one pre-provisioned ratios;
determining subnet characteristics for each of the network slice subnets based on the service requirement set and at least one pre-provisioned rules; and
determining, for each of the network slice subnets, slice subnet requirement based on the associated performance requirement and the associated subnet characteristics.

11. The method of claim 10, further comprising, determining, for each of the network slice subnets in the network slice template hierarchy, whether resource sharing is allowed based on analysis of the slice subnet requirement to determine reuse of existing network slice subnet instances.

12. The method of claim 10, wherein the at least one of existing slice subnet instances is reused, when resource sharing is allowed in the slice subnet requirement, wherein reusing the at least one of existing slice subnet instances, for each of the network slice subnets in the network slice template hierarchy, comprises:
identifying a set of network slice subnet instances matching the network slice subnets;
removing each network slice subnet instance disallowing resource sharing from the set of network slice subnet instances to generate a subset of network slice subnet instances;
determining a resource score for each of the subset of network slice subnet instances;
determining a requirement score for each of the subset of network slice subnet instances; and
identifying one or more network slice subnet instances from the subset of network slice subnet instances to be reused, based on the resource score and the requirement score determined for each of the subset of network slice subnet instances.

13. The method of claim 12, wherein determining the resource score for each of the subset of network slice subnet instances comprises:
determining, for each of the subset of network slice subnet instances, a spare capacity associated with each of the plurality of resource attributes, based on a current capacity of each network slice subnet instance in the subset of network slice subnet instances and resource requirement of each of the plurality of resource attributes;
assigning a resource attribute score to each of the subset of network slice subnet instances for each of the plurality of resource attributes, based on comparison of the determined capacity with a predefined threshold; and computing a resource score for each of the subset of network slice subnet instances, based on an average of resource attribute score assigned to each of the plurality of resource attributes for each of the subset of network slice subnet instances.

14. The method of claim 13, wherein determining the requirement score for each of the subset of network slice subnet instances comprises:
assigning a requirement attribute score to each of the subset of network slice subnet instances for each of the plurality of requirement attributes, based on comparison of each of the plurality of requirement attributes with associated requirement attributes already supported by each of the subset of network slice subnet instances; and
computing a requirement score for each of the subset of network slice subnet instances, based on an average of requirement attribute score assigned to each of the plurality of requirement attributes for each of the subset of network slice subnet instances.

15. The method of claim 14, wherein identifying the one or more network slice subnet instances to be reused comprises:
computing a suitability score for at least one network slice subnet instance from the subset of network slice subnet instances, wherein each of the at least one network slice subnet instance has a resource score greater than zero, and wherein the suitability score for a network slice subnet instance from the at least one network slice subnet instance is determined based on the associated resource score and the associated requirement score;
determining an adjusted suitability score for each of at least one network slice subnet instance, based on a historic Key Performance Indicators (KPI) compliance level associated with each of the at least one network slice subnet instance;
comparing the adjusted suitability score determined for each of at least one network slice subnet instance with a first suitability score threshold;
removing one or more network slice subnet instances from the at least one network slice subnet instance, wherein the adjusted suitability score for each of the one or more network slice subnet instances is below the first suitability score threshold; and
selecting each of the one or more network slice subnet instances having the adjusted suitability score greater than a second suitability score threshold for being reused, wherein a network slice subnet instance from the one or more network slice subnet instances having the highest adjusted suitability score is selected to be reused.

16. The method of claim 10, wherein the at least one new slice subnet instances is created for each of the network slice subnets in the network slice template hierarchy, when at least one condition is satisfied, wherein the at least one condition comprises at least one of resource sharing being disallowed in the slice subnet requirement or non-suitability of reuse of the at least one of existing network slice subnet instances, wherein creating the at least one new slice subnet instances.

17. A system for template-based dynamic network slicing, the system comprising:
a processor; and
a memory communicatively coupled to the processor, wherein the memory comprises processor instructions, which when executed by the processor, cause the processor to:
create service requirement set associated with a service request based on the plurality of characteristics in the service request, wherein the service requirement set comprises service characteristics, service performance requirements, and service dimensions associated with the service request, and wherein a plurality of resource attributes and a plurality of requirement attributes are associated with the service requirement set;
identify a network slice template hierarchy based on the service requirement set, wherein the network slice template hierarchy comprises information associated with at least one of suitable templates for end-to-end network slice, network slice subnets, and corresponding constituents;
select one of reusing one of at least one of existing network slice instance and creating a new network slice instance, based on the identified network slice template hierarchy and the service requirement set;
instantiate a service associated with the service request using one of the at least one of existing network slice instances and the new network slice instance;
monitor the service and one of the at least one of existing network slice instances and the new network slice instance, in response to instantiating the service, wherein a result of the monitoring is used for detecting and fixing at least one issues identified during monitoring of instantiated service; and
perform adaptation of at least one threshold and at least one factor used to perform network slicing, based on the at least one issues identified.

18. The system of claim 17, wherein the processor instructions further cause the processor to receive the service request, wherein the plurality of characteristics of the service request comprises at least one of a type of service, maximum number of users, associated geographical area.

19. The system of claim 17, wherein to create the service requirement set, the processor instructions further cause the processor to:
determine the service characteristics, wherein the determining the service characteristics further comprises:
determining a type of service associated with the service request based on a service category extracted from a service type mapping table; and
determining at least one characteristics based on at least one of the plurality of characteristics in the service request and an adapted service characteristics table;
determine the service performance requirements based on at least one of the plurality of characteristics in the service request, determined type of service and an adapted performance requirements table, and wherein the service performance requirements comprise at least one of latency, guaranteed throughput per user, reliability, availability and their associated target values; and
determine the service dimensions based on at least one of the plurality of characteristics in the service request, wherein the service dimensions comprises at least one a density, maximum number of users, capacity, throughput per slice, or at least one geographical location.

20. A non-transitory computer-readable storage medium having stored thereon, a set of computer-executable instructions causing a computer comprising one or more processors to perform steps comprising:
creating service requirement set associated with a service request based on a plurality of characteristics in the service request, wherein the service requirement set comprises service characteristics, service performance requirements, and service dimensions associated with the service request, and wherein a plurality of resource attributes and a plurality of requirement attributes are associated with the service requirement set;

identifying a network slice template hierarchy based on the service requirement set, wherein the network slice template hierarchy comprises information associated with at least one of suitable templates for end-to-end network slice, network slice subnets, and corresponding constituents;

selecting one of reusing one of at least one of existing network slice instance and creating a new network slice instance, based on the identified network slice template hierarchy and the service requirement set;

instantiating a service associated with the service request using one of the at least one of existing network slice instances and the new network slice instance;

monitoring the service and one of the at least one of existing network slice instances and the new network slice instance, in response to instantiating the service, wherein a result of the monitoring is used for detecting and fixing at least one issues identified during monitoring of instantiated service; and performing adaptation of at least one threshold and at least one factor used to perform network slicing, based on the at least one issues identified.

* * * * *